(12) United States Patent
Mackin

(10) Patent No.: US 10,954,865 B2
(45) Date of Patent: Mar. 23, 2021

(54) PRESSURIZED AIR SYSTEMS FOR AIRCRAFT AND RELATED METHODS

(71) Applicant: The Boeing Company, Chicago, IL (US)

(72) Inventor: Steve G. Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 16/012,327

(22) Filed: Jun. 19, 2018

(65) Prior Publication Data

US 2019/0383220 A1 Dec. 19, 2019

(51) Int. Cl.
*F02C 9/18* (2006.01)
*B64D 13/02* (2006.01)
(Continued)

(52) U.S. Cl.
CPC ............... *F02C 9/18* (2013.01); *B64D 13/02* (2013.01); *B64D 13/06* (2013.01); *B64D 41/00* (2013.01);
(Continued)

(58) Field of Classification Search
CPC .... B64D 2013/0618; B64D 2013/0648; B64D 2013/0696; F02C 6/06; F02C 6/08; F02C 7/277; F02C 9/18
See application file for complete search history.

(56) References Cited

U.S. PATENT DOCUMENTS 2,800,002 A   7/1957 Seed
4,015,438 A   4/1977 Kinsell et al.
(Continued)

FOREIGN PATENT DOCUMENTS

CA     2773229      5/2011
CN     102596719    7/2012
(Continued)

OTHER PUBLICATIONS

14 C.F.R. Part 25.831 effective as of Jan. 21, 1997, last retrieved from http://www.airweb.faa.gov/Regulatory_and_Guidance_Library%5CrgFAR.nsf/0/E84799D57F7D41DF852566720051B01D?OpenDocument on Aug. 2, 2013, 3 pages.
(Continued)

*Primary Examiner* — Scott J Walthour
(74) *Attorney, Agent, or Firm* — Hanley, Flight & Zimmerman, LLC

(57) ABSTRACT

Pressurized air systems for aircraft and related methods are described herein. An example pressurized air system includes a compressor having a compressor inlet and a compressor outlet. The compressor inlet receives air from a first air source and the compressor outlet supplies pressurized air to an environmental control system (ECS). The pressurized air system includes a turbine having a turbine inlet to receive air from a second air source, a first overrunning clutch operatively coupled between an output shaft of an accessory gearbox and the compressor, the accessory gearbox operatively coupled to a drive shaft extending from an engine of the aircraft, and a second overrunning clutch operatively coupled between the compressor and the turbine. The first and second overrunning clutches enable the accessory gearbox to drive the compressor during a first mode of operation and enable the turbine to drive the compressor during a second mode of operation.

20 Claims, 11 Drawing Sheets

(51) Int. Cl.
*F02C 7/277* (2006.01)
*B64D 13/06* (2006.01)
*B64D 41/00* (2006.01)

(52) U.S. Cl.
CPC ...... *F02C 7/277* (2013.01); *B64D 2013/0611* (2013.01); *B64D 2013/0618* (2013.01); *B64D 2013/0696* (2013.01); *F05D 2220/323* (2013.01); *F05D 2220/50* (2013.01); *F05D 2260/606* (2013.01); *F05D 2260/85* (2013.01)

(56) References Cited

U.S. PATENT DOCUMENTS

| | | | |
|---|---|---|---|
| 4,262,495 A | 4/1981 | Gupta et al. | |
| 4,419,926 A | 12/1983 | Cronin et al. | |
| 4,487,034 A | 12/1984 | Cronin et al. | |
| 4,503,666 A | 3/1985 | Christoff | |
| 4,684,081 A | 8/1987 | Cronin | |
| 5,036,678 A | 8/1991 | Renninger et al. | |
| 5,063,963 A | 11/1991 | Smith | |
| 5,114,100 A | 5/1992 | Rudolph | |
| 5,136,837 A | 8/1992 | Davison | |
| 5,143,329 A | 9/1992 | Coffinberry | |
| 5,363,641 A | 11/1994 | Dixon et al. | |
| 5,414,992 A | 5/1995 | Glickstein | |
| 5,482,229 A | 1/1996 | Asshauer | |
| 5,524,848 A | 6/1996 | Ellsworth | |
| 5,813,630 A | 9/1998 | Williams | |
| 5,899,805 A | 5/1999 | Dowd et al. | |
| 5,967,461 A | 10/1999 | Farrington | |
| 6,189,324 B1 | 2/2001 | Williams et al. | |
| 6,305,156 B1 | 10/2001 | Lui | |
| 6,401,473 B1 | 6/2002 | Ng et al. | |
| 6,415,595 B1 | 7/2002 | Wilmot, Jr. et al. | |
| 6,491,254 B1 | 12/2002 | Walkinshaw et al. | |
| 6,526,775 B1 | 3/2003 | Asfia et al. | |
| 6,629,428 B1 | 10/2003 | Murry | |
| 6,681,592 B1 | 1/2004 | Lents et al. | |
| 6,688,558 B2 | 2/2004 | Breer et al. | |
| 6,709,246 B2 | 3/2004 | Boyd | |
| 6,796,131 B2 | 9/2004 | Sampson | |
| 6,942,183 B2 | 9/2005 | Zywiak | |
| 6,971,241 B2 | 12/2005 | Critchley et al. | |
| 6,997,013 B2 | 2/2006 | Jones | |
| 7,207,521 B2 | 4/2007 | Atkey et al. | |
| 7,246,482 B2 | 7/2007 | Mahoney et al. | |
| 7,467,524 B2 | 12/2008 | Brutscher et al. | |
| 7,607,318 B2 | 10/2009 | Lui et al. | |
| 7,618,008 B2 | 11/2009 | Scherer et al. | |
| 7,727,057 B2 | 6/2010 | Beier et al. | |
| 7,871,038 B2 | 1/2011 | Space et al. | |
| 8,047,470 B2 | 11/2011 | Porte | |
| 8,063,501 B2 | 11/2011 | Finney | |
| 8,529,189 B2 | 9/2013 | Brown et al. | |
| 8,769,962 B2 | 7/2014 | Glahn et al. | |
| 8,955,794 B2 | 2/2015 | Mackin et al. | |
| 8,967,528 B2 | 3/2015 | Mackin et al. | |
| 9,163,562 B2 | 10/2015 | Suciu et al. | |
| 9,416,677 B2 | 8/2016 | Munsell et al. | |
| 9,605,591 B2* | 3/2017 | Warren | H02J 3/008 |
| 9,765,700 B2 | 9/2017 | Mackin et al. | |
| 9,810,158 B2 | 11/2017 | Foutch et al. | |
| 9,835,050 B2 | 12/2017 | Marche | |
| 9,879,610 B2 | 1/2018 | Moes | |
| 10,550,770 B2 | 2/2020 | Foutch et al. | |
| 2001/0032472 A1 | 10/2001 | Buchholz et al. | |
| 2003/0005718 A1 | 1/2003 | Mitani et al. | |
| 2003/0051492 A1 | 3/2003 | Hartenstein et al. | |
| 2003/0177781 A1 | 9/2003 | Haas et al. | |
| 2004/0172963 A1 | 9/2004 | Axe et al. | |
| 2005/0051668 A1 | 3/2005 | Atkey et al. | |
| 2006/0260323 A1 | 11/2006 | Moulebhar | |
| 2006/0272313 A1 | 12/2006 | Eick et al. | |
| 2008/0314060 A1 | 12/2008 | Parikh | |
| 2009/0277445 A1 | 11/2009 | Markwart | |
| 2009/0302152 A1* | 12/2009 | Knight | F02C 7/36 244/58 |
| 2009/0314002 A1 | 12/2009 | Libera et al. | |
| 2010/0107594 A1 | 5/2010 | Coffinberry et al. | |
| 2010/0192574 A1 | 8/2010 | Langson | |
| 2010/0192593 A1 | 8/2010 | Brown et al. | |
| 2011/0107777 A1 | 5/2011 | Atkey et al. | |
| 2012/0111022 A1 | 5/2012 | Dyer | |
| 2012/0186267 A1 | 7/2012 | Coffinberry et al. | |
| 2013/0098059 A1 | 4/2013 | Suciu et al. | |
| 2013/0164115 A1 | 6/2013 | Sennoun | |
| 2013/0187007 A1 | 7/2013 | Mackin et al. | |
| 2013/0269374 A1 | 10/2013 | Kelnhofer | |
| 2014/0196470 A1 | 7/2014 | Glahn et al. | |
| 2015/0121842 A1 | 5/2015 | Moes | |
| 2015/0233291 A1 | 8/2015 | Pelagatti et al. | |
| 2015/0275758 A1 | 10/2015 | Foutch et al. | |
| 2015/0275769 A1 | 10/2015 | Foutch et al. | |
| 2016/0369705 A1 | 12/2016 | Makcin et al. | |
| 2017/0268430 A1 | 9/2017 | Schwarz | |
| 2017/0268431 A1 | 9/2017 | Schwarz | |
| 2018/0080383 A1* | 3/2018 | Snape | F02C 7/185 |

FOREIGN PATENT DOCUMENTS

| | | |
|---|---|---|
| DE | 102006042584 | 3/2008 |
| EP | 0888966 | 1/1999 |
| EP | 2470425 | 7/2012 |
| EP | 3296543 | 3/2018 |
| JP | 2013510042 | 3/2013 |
| WO | 1999/20528 | 4/1999 |
| WO | 2000/37313 | 6/2000 |
| WO | 0123724 | 4/2001 |
| WO | 2007/093389 | 8/2007 |
| WO | 2011/056285 | 5/2011 |

OTHER PUBLICATIONS

Extended European Search Report, issued by the European Patent Office in connection with European Patent Application No. 14175279.0 dated Dec. 3, 2014, 9 pages.

Communication Under Rule 71(3) EPC, issued by the European Patent Office in connection with European Application No. 10 750 014.2-1753, dated Jun. 28, 2013, 5 pages.

International Search Report, issued by the International Searching Authority in connection with International Application No. PCT/US2010/047357, dated Dec. 3, 2010, 5 pages.

Written Opinion, issued by the International Searching Authority issued in connection with International Application No. PCT/US2010/047357, dated Dec. 3, 2010, 5 pages.

International Preliminary Report on Patentability, issued by the International Bureau in connection with International Application No. PCT/US2010/047357, dated May 8, 2012, 6 pages.

Office Action, issued by the United States Patent and Trademark Office in connection with U.S. Appl. No. 12/614,441, dated Apr. 26, 2013, 21 pages.

Office Action, issued by the United States Patent and Trademark Office in connection with U.S. Appl. No. 12/614,441, dated Jul. 3, 2014, 24 pages.

Final Rejection, issued by the United States Patent and Trademark Office in connection with U.S. Appl. No. 12/614,441, dated Jan. 3, 2014, 22 pages.

Advisory Action, issued by the United States Patent and Trademark Office in connection with U.S. Appl. No. 12/614,441, dated May 22, 2014, 3 pages.

Notice of Allowance and Fee(s) Due, issued by the United States Patent and Trademark Office in connection with U.S. Appl. No. 12/614,441, dated Dec. 5, 2014, 7 pages.

Restriction and/or Election Requirement, issued by the United States Patent and Trademark Office in connection with U.S. Appl. No. 13/357,293, dated Sep. 25, 2013, 5 pages.

Office Action, issued by the United States Patent and Trademark Office in connection with U.S. Appl. No. 13/357,293, dated Feb. 7, 2014, 9 pages.

(56) References Cited

OTHER PUBLICATIONS

Notice of Allowance and Fee(s) Due, issued by the United States Patent and Trademark Office in connection with U.S. Appl. No. 13/357,293, dated Sep. 30, 2014, 13 pages.
Office Action, issued by the United States Patent and Trademark Office in connection with U.S. Appl. No. 13/951,181, dated Apr. 16, 2014, 9 pages.
Notice of Allowance and Fee(s) Due, issued by the United States Patent and Trademark Office in connection with U.S. Appl. No. 13/951,181, dated Sep. 30, 2014, 14 pages.
Communication Pursuant to Article 94(3) EPC, issued by the European Patent Office in connection with European Patent Application 13152433.2, dated Oct. 28, 2015, 4 pages.
United States Patent and Trademark Office, "Non-Final Office Action," issued in connection with U.S. Appl. No. 14/632,322, dated Aug. 12, 2016, 21 pages.
United States Patent and Trademark Office, "Restriction and/or Election Requirement," issued in connection with U.S. Appl. No. 14/242,570, dated Nov. 2, 2016, 10 pages.
United Stated Patent and Trademark Office, "Restriction and/or Election Requirement," issued in connection with U.S. Appl. No. 14/242,493, dated Dec. 6, 2016, 9 pages.
United Stated Patent and Trademark Office, "Non-Final Office Action," issued in connection with U.S. Appl. No. 14/242,570, dated Dec. 16, 2016, 23 pages.
United States Patent and Trademark Office, "Non-Final Office Action," issued in connection with U.S. Appl. No. 14/242,493, dated Mar. 20, 2017, 63 pages.
United States Patent and Trademark Office, "Notice of Allowance and Fee(s) Due," issued in connection with U.S. Appl. No. 14/632,322, dated Apr. 17, 2017, 17 pages.
United States Patent and Trademark Office, "Notice of Allowance and Fee(s) Due," issued in connection with U.S. Appl. No. 14/242,570, dated Jun. 28, 2017, 38 pages.
United States Patent and Trademark Office, "Notice of Allowance and/or Fees Due," issued in connection with U.S. Appl. No. 14/242,493, dated Apr. 4, 2018, 20 pages.
United States Patent and Trademark Office, "Non-Final Office Action," issued in connection with U.S. Appl. No. 14/744,398, dated Jan. 26, 2018, 43 pages.
United States Patent and Trademark Office, "Notice of Allowance and Fee(s) Due", issued in connection with U.S. Appl. No. 15/787,511 dated Sep. 25, 2019, 8 pages.
European Patent Office, "Extended European Search Report", issued in connection with application No. 19179755.4 dated Oct. 30, 2019, 5 pages.
European Patent Office, "Extended European Search Report", issued in connection with application No. 19207965.5 dated Apr. 17, 2020, 7 pages.

* cited by examiner

PRESSURIZED AIR SYSTEMS FOR AIRCRAFT AND RELATED METHODS

FIELD OF THE DISCLOSURE

This disclosure relates generally to aircraft and, more particularly, to pressurized air systems for aircraft and related methods.

BACKGROUND

Commercial aircraft typically include one or more systems that operate using pressurized air. For example, commercial aircraft often employ an environmental control system (an ECS) to pressurize a passenger cabin of the aircraft and/or thermal anti-icing systems to provide heated air for anti-icing applications, both of which operate on pressurized air. Air supply is typically provided to these systems by bleed air extracted from or otherwise provided by a compressor of an aircraft engine. To meet the pressure and/or temperature demands of the various aircraft systems, bleed air is often extracted from a higher stage of the compressor that provides bleed air having a pressure and/or temperature above that demanded by the various systems. The pressurized bleed air is then often cooled, via a precooler, and reduced in pressure, via a pressure regulating valve, prior to providing the bleed air to the systems. Therefore, much of the energy spent by the engine to produce the bleed air is wasted when cooling the bleed air and/or reducing the pressure of the bleed air and, thus, extracting high-pressure bleed air in such a manner may reduce the efficiency of the engine.

SUMMARY

Disclosed herein is an example pressurized air system for an aircraft. The pressurized air system includes a compressor having a compressor inlet and a compressor outlet. The compressor inlet is to receive air from a first air source and the compressor outlet is to supply pressurized air to an environmental control system (ECS) of the aircraft. The pressurized air system includes a turbine having a turbine inlet to receive air from a second air source, a first overrunning clutch operatively coupled between an output shaft of an accessory gearbox and the compressor, the accessory gearbox operatively coupled to a drive shaft extending from an engine of the aircraft, and a second overrunning clutch operatively coupled between the compressor and the turbine. The first and second overrunning clutches enable the accessory gearbox to drive the compressor during a first mode of operation and enable the turbine to drive the compressor during a second mode of operation.

An example method disclosed herein includes operating, via a controller, a pressurized air system in a first mode of operation. The pressurized air system includes a compressor operatively coupled to an accessory gearbox via a first overrunning clutch. A compressor outlet of the compressor is fluidly coupled to one or more systems of an aircraft that receive pressurized air. The pressurized air system also includes a turbine operatively coupled to the compressor via a second overrunning clutch, wherein, during the first mode of operation, the accessory gearbox drives the compressor to produce the pressurized air. The method further includes determining, via the controller, an operating speed of an engine of the aircraft, and, when the operating speed is below a threshold speed, operating the pressurized air system in a second mode of operation by sending, via the controller, a command signal to open a turbine inlet valve disposed between the turbine and a bleed air port of the engine such that bleed air is supplied to the turbine to power the turbine to drive the compressor to produce the pressurized air.

An example aircraft disclosed herein concludes a system that operates via pressurized air, an accessory gearbox operatively coupled to and powered by a drive shaft extending from an engine, and a pressurized air system. The pressurized air system includes a compressor having a compressor outlet fluidly coupled to the system that operates via pressurized air. The compressor is operatively coupled to the accessory gearbox. The pressurized air system also includes a turbine and an overrunning clutch operatively coupled between the compressor and the turbine. The accessory gearbox is to drive the compressor in a first mode of operation to produce pressurized air, and the turbine is to drive the compressor in a second mode of operation to produce the pressurized air. The overrunning clutch is to disconnect the compressor from the turbine while the accessory gearbox is driving the compressor in the first mode of operation.

BRIEF DESCRIPTION OF THE DRAWINGS

In FIG. 2, the system is operating a first mode of operation in which a radial drive shaft extending from the engine is used to power a compressor to produce pressurized air.

Figure 1:
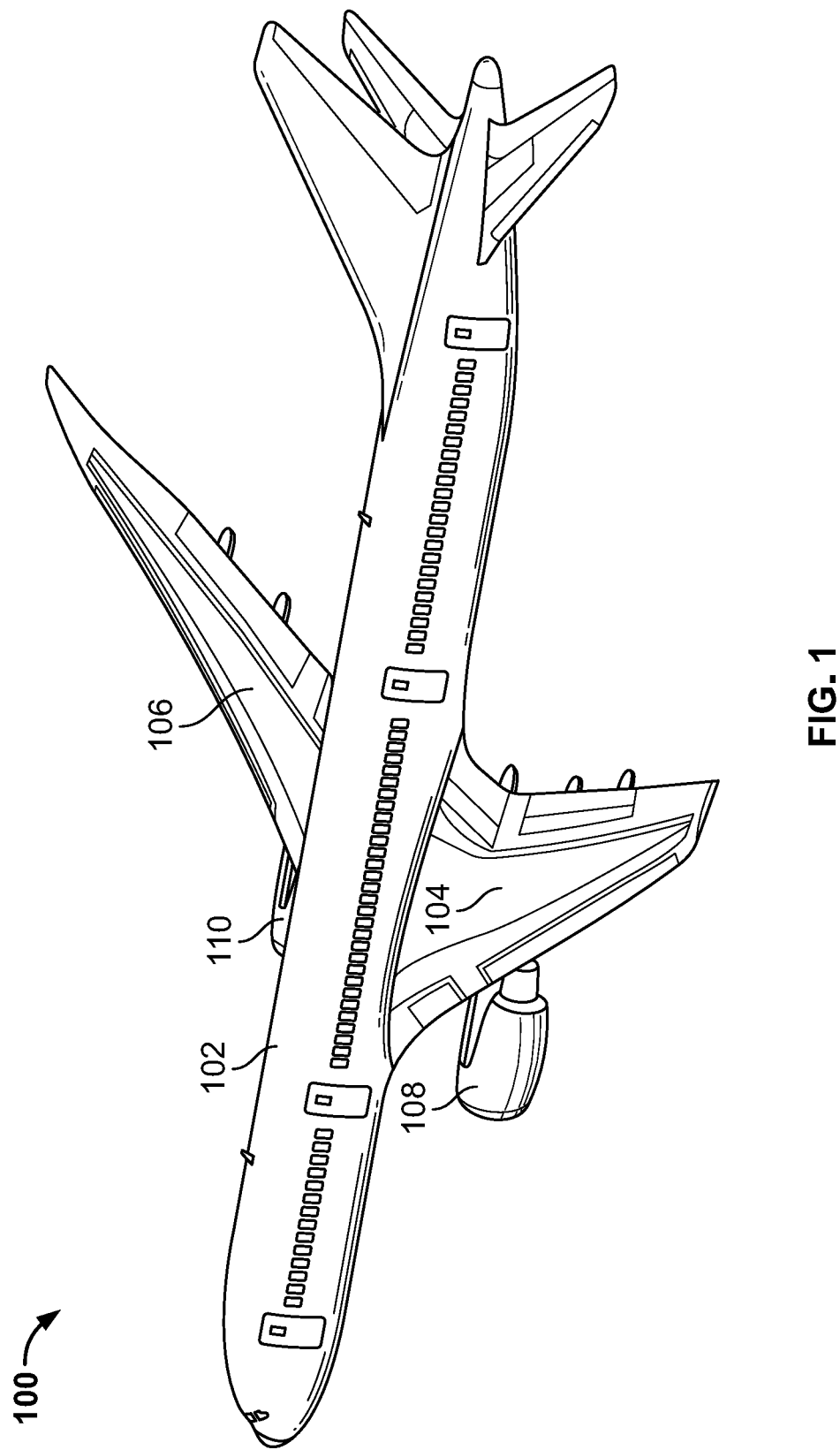
FIG. 1 illustrates an example aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Example pressurized air systems and related methods are disclosed herein. The example pressurized air systems disclosed herein utilize a compressor to create pressurized air that can be supplied to one or more systems of an aircraft that operate and/or utilize high pressure air. Such systems include, for example, an environmental control system (ECS), a thermal anti-icing system (e.g., a wing and/or engine, anti-icing system), a pneumatic supply system (to supply pneumatic devices), and/or any other system of an aircraft that requires use of high pressure/compressed air.

An example pressurized air system disclosed herein operates between a first mode of operation in which the compressor is powered via a mechanical connection by an aircraft engine and a second mode of operation in which another power source, such as a turbine, is used to power the compressor. In particular, the compressor is operatively coupled to an accessory gearbox via a first overrunning clutch. The accessory gearbox is driven by a radial drive shaft connected to a drive shaft (a spool) of the aircraft engine. In the first mode of operation, the first overrunning clutch is engaged such that aircraft engine powers the compressor via the radial drive shaft and the accessory gearbox. In some examples, the system operates in the first mode of operation during certain flight conditions such as during take-off, climb, and/or cruise where the engine is operating at a medium or high speed. Using the radial drive shaft to power the compressor is an efficient manner to generate pressurized air through a majority of the flight, rather than extracting and utilizing bleed air from the engine.

If the engine is operating at a lower speed, such as during idle or descent, that may not supply sufficient power to compressor, the system can switch to the second mode of operation where the turbine is used to power the compressor to produce pressurized air. The turbine is powered via bleed air extract from a compressor of the aircraft engine. The extracted bleed air drives the turbine at a relatively high speed to enable the turbine to power the compressor when the engine drive shaft is not rotating at a high enough speed to provide sufficient power to the compressor. In the example system, a second overrunning clutch is operatively coupled between the compressor and the turbine. In the first mode of operation, the second overrunning clutch is disengaged, which enables the compressor to operate without driving the turbine. However, in the second mode of operation, the second overrunning clutch is engaged, which enables the turbine to drive the compressor. Also, while in the second mode of operation, the first overrunning clutch (which is operatively coupled between the compressor and the accessory gearbox) is disengaged, which enables the turbine to drive the compressor without driving the accessory gearbox. As such, the use of two overrunning clutches enables the accessory gearbox or the turbine to power the compressor independently of the other.

In some examples, the system also includes functionality to start the aircraft engine. For example, the system can operate in a third mode of operation where the turbine is used to start the aircraft engine. Known aircraft systems include a separate starter turbine, which generally adds more weight and components to the system. The example systems disclosed herein can utilize the turbine from the pressurized air system to start the aircraft engine, thereby reducing the overall weight to the aircraft. The example system can include a third overrunning clutch operatively coupled between the turbine and a starter input on the accessory gearbox. In an example operation, high pressure air is provided to the turbine, which then drives the starter input via the third overrunning clutch. Once the engine is started, the third overrunning clutch disengages because the starter input shaft is rotating faster than the input from the turbine. As such, the third overrunning clutch enables the turbine to drive the accessory gearbox (and, thus, drive the aircraft engine) during a starting operation but also enables the turbine to disconnect from the accessory gearbox (and, thus, the aircraft engine) once the engine is running. In other examples disclosed herein, a separate starter turbine can be used to start the aircraft engine during the third mode of operation. Once started, the system is used to produce pressurized air in the first mode of operation or the second mode of operation.

Also disclosed herein are example systems that utilize an electric motor rather than a turbine to power the compressor during the second mode of operation. In such examples, the second overrunning clutch is operatively coupled between the compressor and the electric motor. The second overrunning clutch enables the compressor to operate independent of the electric motor during the first mode of operation but also enables the electric motor to drive the compressor during the second mode of operation. The electric motor can also be used in the third mode of operation to start the aircraft engine.

FIG. 1 illustrates an example aircraft 100 in which the examples disclosed herein can be implemented. The aircraft 100 includes a fuselage 102, which defines a passenger cabin, a first wing 104 coupled to the fuselage 102, and a second wing 106 coupled to the fuselage 102. In the illustrated example, the aircraft 100 includes a first engine 108 carried by the first wing 104 and a second engine 110 carried by the second wing 106. In other examples, the aircraft 100 may include only one engine or may include more than two engines. The engine(s) can be coupled to the first and/or second wings 104, 106 and/or another structure on the aircraft 100 (e.g., on the tail section of the fuselage 102).

Each aircraft engine 108, 110 can employ a dedicated pressurized air system as disclosed herein. The example pressurized air systems disclosed herein produce compressed or pressurized air that can be supplied to one or more aircraft systems, such as an environmental control system (ECS), a thermal anti-icing system (e.g., a wing and/or engine, anti-icing system), a pneumatic supply system (to supply pneumatic devices), and/or any other system of the aircraft that requires use of compressed air. The pressurized air systems can also be used to start the respective engines 108, 110.

Figure 2:
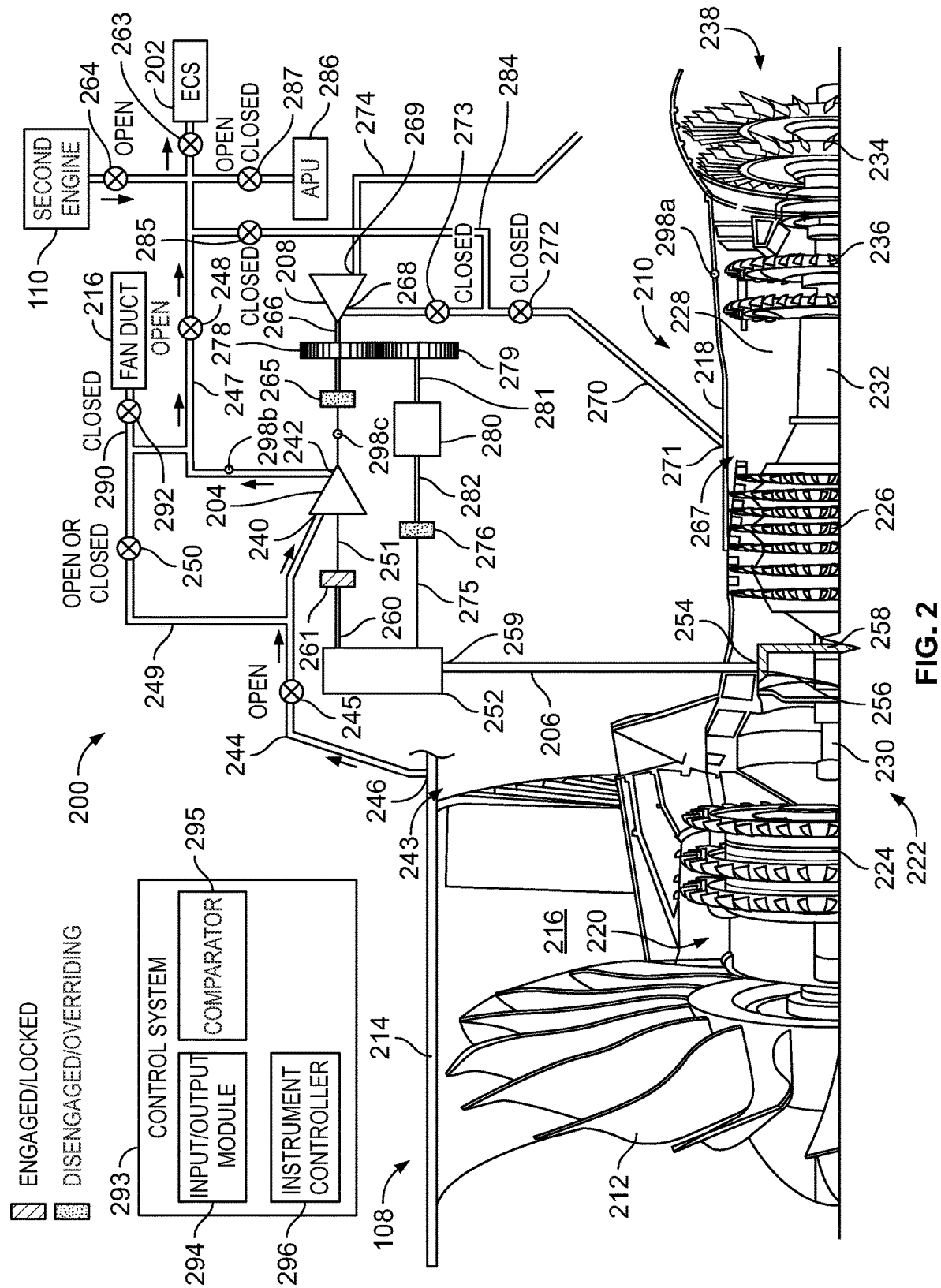
FIG. 2 is a schematic illustration of an example pressurized air system that can be implemented in connection with an engine of the example aircraft of FIG. 1.

FIG. 2 is a schematic illustration of an example pressurized air system 200 (referred to herein as the system 200) constructed in accordance with the teachings of this disclosure. The example system 200 is implemented in connection with the first engine 108 (shown in a partial cutaway view)

of the example aircraft 100 (FIG. 1). However, the example system 200 can be similarly implemented in connection with the second engine 110 (FIG. 1). The system 200 operates to produce compressed or pressurized air that can be used by one or more systems of the aircraft 100. For example, as shown in FIG. 2, the system 200 is fluidly coupled to an ECS 202. The ECS 202, for example, conditions the pressurized air to a cabin pressure and/or cabin temperature. The ECS 202 can include, for example, one or more ECS packs (e.g., an air cycle refrigeration system) that receive the pressurized air from the system 200 and conditions or regulates the air to cabin pressure and/or temperature. Additionally or alternatively, the pressurized air can be used by one or more other systems of the aircraft 100, such as a thermal anti-icing system (e.g., a wing and/or engine, anti-icing system), a pneumatic supply system (to supply pneumatic devices), etc. The pressurized air system 200 can also include functionality to start the first engine 108, as disclosed in further detail herein.

In the illustrated example, the system 200 includes a compressor 204 that is used to generate the pressurized air that is provided to the ECS 202 and/or the one or more other aircraft systems. The system 200 is operable in a first mode of operation where a drive shaft 206, referred to herein as the radial drive shaft 206, operatively coupled to the first engine 108 is used to power the compressor 204 to produce the pressurized air (disclosed in connection with FIG. 2) and a second mode of operation where a turbine 208 is used to power the compressor 204 (disclosed in connection with FIG. 4) to produce the pressurized air. In some examples, the system 200 can also operate in a third mode of operation where the turbine 208 is used to start the first engine 108, which is disclosed in further detail in connection with FIG. 5 below. Before disclosing the aspects of the system 200 in detail, a description of the first engine 108 is provided below.

In the illustrated example of FIG. 2, the first engine 108 is implemented as turbofan engine having a gas turbine engine 210 (sometimes referred to as an engine core) and a fan 212. The gas turbine engine 210 is used to drive the fan 212 to produce thrust. The fan 212 rotates within a nacelle 214 of the first engine 108. A fan duct 216 (e.g., a bypass, a passageway, a channel, a nozzle duct, etc.) is defined between an outer wall 218 (sometimes referred to as a core cowl) of the gas turbine engine 210 and the nacelle 214. As the fan 212 rotates, the fan 212 produces airflow. A portion of the airflow flows through the fan duct 216 and bypasses the gas turbine engine 210 to produce forward thrust and another portion of the airflow is also provided to the gas turbine engine 210 for combustion.

The gas turbine engine 210 operates by drawing air through a core air intake 220 (at a fore end of the gas turbine engine 210) and into a compressor 222. In particular, when the gas turbine engine 210 is running, a portion of the airflow from the fan duct 216 is diverted through the core air intake 220 and into the compressor 222 of the gas turbine engine 210. The compressor 222 can include multiple compressor sections. For example, the compressor 222 of FIG. 2 is a dual-axial compressor that includes two compressors, a first compressor 224 and a second compressor 226. Each of the first and second compressors 224, 226 includes various compressor stages that progressively increase the pressure of the air as the air flows from the core air intake 220 to a combustion chamber 228. The first compressor 224 is a low-pressure compressor (LPC) that provides relatively low pressure air and the second compressor 226 is a high-pressure compressor (HPC) that provides relatively high pressure air. The first compressor 224 is coupled to a first drive shaft 230 (sometimes referred to as a low speed spool or N1), and the second compressor 226 is coupled to a second drive shaft 232 (sometimes referred to as a high speed spool or N2). The first drive shaft 230 is coupled to and driven by a first turbine 234 (e.g., a low-pressure turbine (LPT)) and the second drive shaft 232 is coupled to and driven a second turbine 236 (e.g., a high-pressure turbine (HPT)). In this example, the compressor 222 is a dual-axial compressor that includes the two compressors 224, 226. However, in other examples, the compressor 222 can include more or fewer compressor sections, each coupled to a turbine via a respective shaft.

After exiting the second compressor 226 (the HPC), the highly pressurized air is provided to the combustion chamber 228 where fuel is injected and mixed with the highly pressurized air and ignited. The high energy airflow exiting the combustion chamber 228 turns the blades of the first and second turbines 234, 236, which are coupled to respective ones of the first and second drive shafts 230, 232. The first drive shaft 230 extends through and rotates independently of the second drive shaft 232. As such, rotation of the first and second drive shafts 230, 232 turns the blades of the first and second compressors 224, 226, respectively. The heated air is exhausted via a nozzle 238, aftward, where it mixes with the accelerated airflow provided by the fan 212 in the fan duct 216 to produce forward thrust that propels the aircraft 100 in a forward direction. While in this example the first engine 108 is implemented as a turbofan engine, the example system 200 can similarly be implemented in connection with other types of engines, such as a turbo-prop engine.

In the illustrated example, the compressor 204 includes a compressor inlet 240 and a compressor outlet 242. The compressor 204, when driven, increases a pressure of air from the compressor inlet 240 to the compressor outlet 242. The compressor inlet 240 receives air from a first air source 243. In this example, the first air source 243 is fan air from the fan air duct 216 of the first engine 108. As illustrated in FIG. 2, a first passageway 244 provides air to the compressor inlet 240 from the fan duct 216. In particular, the first passageway 244 is coupled to a port 246 in the nacelle 214. Thus, the first passageway 244 provides fan air to the compressor 204, as shown by the arrows. However, in other examples, the first air source 243 can be air from one or more other sources (e.g., ambient air, bleed air from the first compressor 224, etc.). Thus, the first passageway 244 can be fluidly coupled to another location (e.g., a bleed air port on the gas turbine engine 210). As shown in FIG. 2, a first valve 245 is coupled to the first passageway 244 to control the flow of air through the first passageway 244 to the compressor inlet 240. In the first mode of operation, the first valve 245 is open, which enables fan air to flow from the fan duct 216 to the compressor inlet 240. The compressor 204, when operating, increases the pressure of the fan air from the compressor inlet 240 to the compressor outlet 242.

In the illustrated example, a second passageway 247 fluidly couples the compressor outlet 242 to the ECS 202 and/or the one or more other systems. As such, the compressor 204 produces pressurized air that can be supplied to the ECS 202 and/or the one or more other aircraft systems that receive pressurized air, as shown by the arrows. A second valve 248 is coupled to the second passageway 247 to control the flow of air through the second passageway 247 to the ECS 202 and/or the one or more other systems that receive the pressurized air. In the first mode of operation, the second valve 248 is open, which enables the high pressure air to flow through the second passageway 247 to the ECS 202 and/or the one or more other systems that receive pressurized air.

In the illustrated example, the system 200 includes a third passageway 249 fluidly coupling the first passageway 244 and the second passageway 247. The third passageway 249 can be used as an add-heat or recirculation path to increase the temperature of the pressurized air generated by the compressor 204. A third valve 250 (which may be referred to as an add-heat valve or recirculation valve) is coupled to the third passageway 249. The third valve 250 can be opened or closed depending on whether heat is to be added to the pressurized air. If the third valve 250 is closed, no air flows through the third passageway 249. If the third valve 250 is open, a portion of the pressurized air exiting the compressor outlet 242 (which is relatively warm) is directed through the third passageway 249 to the first passageway 244 and back into the compressor inlet 240. This recirculation process increases the temperature of the pressurized air generated at the compressor outlet 242. When the temperature of the air outside the aircraft 100 is cold, for example, the third valve 250 can be opened to increase the temperature of the fan air being provided to the compressor inlet 240, thereby increasing the temperature of the pressurized air generated at the compressor outlet 242.

In the illustrated example, the compressor 204 includes a compressor shaft 251 (which, in some examples, is coupled to an impeller in a housing). When the compressor shaft 251 is driven, the compressor 204 operates to increase the pressure of air moving from the compressor inlet 240 to the compressor outlet 242. In some examples, the compressor shaft 251 is supported by bearings (e.g., air bearings) to enable smooth rotation of the compressor shaft 251.

As disclosed herein, the system 200 is operable in different modes. In a first mode of operation, which is shown in FIG. 2, the compressor shaft 251 is driven by a mechanical connection between the compressor 204 and the first engine 108, and in a second mode of operation, the compressor shaft 251 is driven by the turbine 208 (e.g., which may be powered via bleed air from the first engine 108). The second mode of operation is disclosed in further detail in connection with FIG. 4.

In the first mode of operation, as shown in FIG. 2, the compressor 204 is driven by the radial drive shaft 206 that is operatively coupled to and driven by the first engine 108. During certain operating conditions, the radial drive shaft 206 of the illustrated example provides power to the compressor 204 more efficiently than the turbine 208. Thus, using the radial drive shaft 206 to power the compressor 204 during certain flight conditions significantly increases the efficiency of the aircraft 100 (e.g., by using less fuel).

In the illustrated example, the system 200 includes an auxiliary or accessory gearbox 252 (e.g., a transfer case) that is operatively coupled to and powered by the radial drive shaft 206. A first end 254 of the radial drive shaft 206 is operatively coupled to the first engine 108. In this example, the first end 254 of the radial drive shaft 206 is coupled to a first gear 256. The first gear 256 is engaged with a second gear 258 that is coupled to the second drive shaft 232 (the high speed spool) of the gas turbine engine 210. In the example shown, the first and second gears 256, 258 are bevel gears oriented substantially perpendicular to each other. A second end 259 of the radial drive shaft 206 is operatively coupled to the accessory gearbox 252. When the first engine 108 is operating, the second drive shaft 232 rotates about its longitudinal axis. The second gear 258, which is engaged with the first gear 256, rotates the first gear 256 and, thus, rotates the radial drive shaft 206 about its longitudinal axis. As a result, the radial drive shaft 206 powers the accessory gearbox 252. In other examples, the radial drive shaft 206 may be operatively coupled to the first drive shaft 230 (the low speed spool) of the gas turbine engine 210.

The accessory gearbox 252 includes one or more output shafts (power take-offs) that can be used to power one or more accessories of the aircraft (e.g., a pump, a generator, etc.). The accessory gearbox 252 can be configured to provide different gear ratios between the radial drive shaft 206 and different output shafts. In the illustrated example, the compressor 204 is coupled to a first output shaft 260 of the accessory gearbox 252. In some examples, the accessory gearbox 252 provides a 2:1 gear ratio between the radial drive shaft 206 and the first output shaft 260. As such, when the second drive shaft 232 (the high speed spool) of the gas turbine engine 210 is rotating at 20,000 RPMs, the first output shaft 260 is rotating at 40,000 RPMs. The system 200 includes a first overrunning clutch 261 (sometimes referred to as a freewheel, a no-back clutch, or a one-way roller clutch) that is operatively coupled between the compressor 204 and the first output shaft 260. In particular, the first overrunning clutch 261 couples the compressor shaft 251 and the first output shaft 260. The first overrunning clutch 261 operates between an engaged or locked state and a disengaged or overriding state. In the engaged state, the first output shaft 260 rotates the compressor shaft 251, thereby transferring power from the accessory gearbox 252 to the compressor 204. In the disengaged state, the compressor shaft 251 can rotate faster than the first output shaft 260, thereby enabling the compressor 204 to operate independently of the accessory gearbox 252, as disclosed in further detail herein. In the figures, cross-hatching is used to indicate an overrunning clutch is engaged, whereas dots (stippling) is used to indicate an overrunning clutch is disengaged.

Figure 3A:
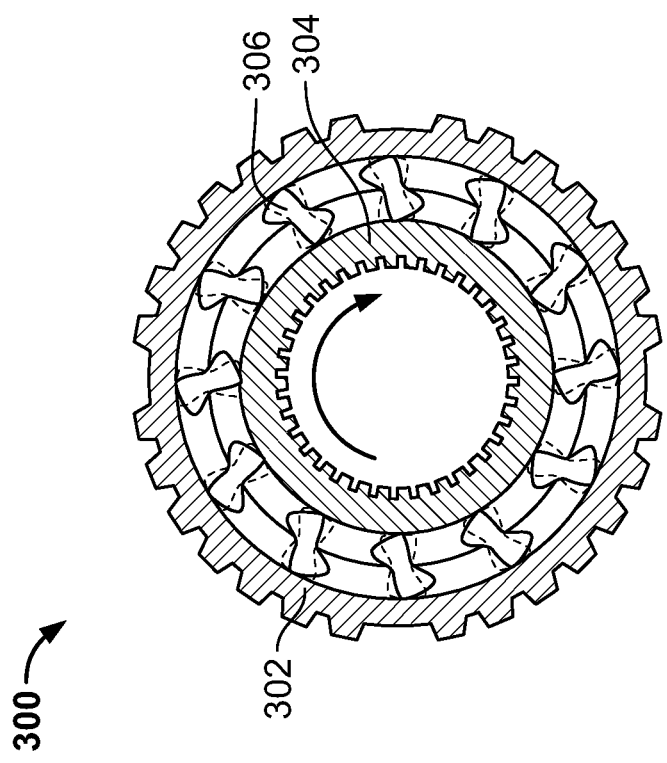
FIGS. 3A and 3B are cross-sectional views of an example sprag clutch that may be implemented in the example pressurized air system of FIG. 2.
Figure 3B:
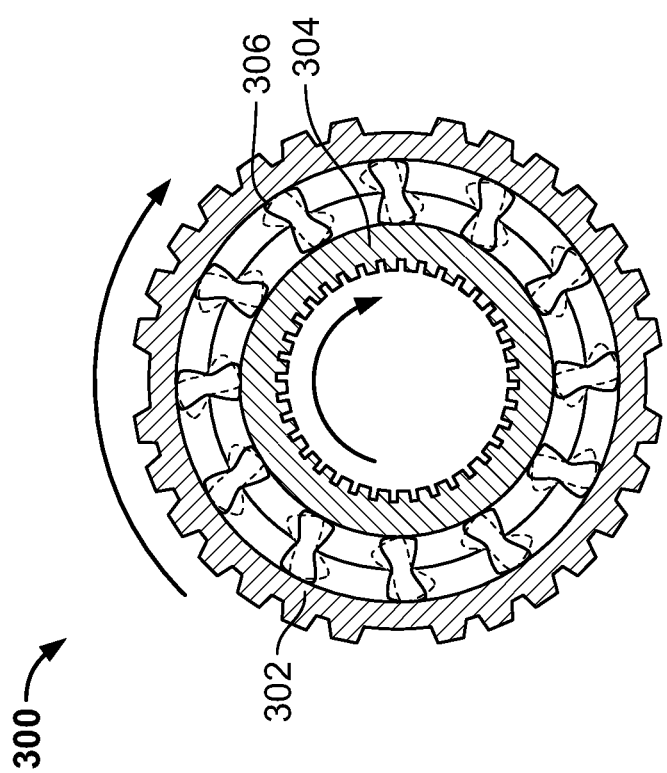

FIGS. 3A and 3B illustrate an example sprag clutch 300 that can be implemented as the first overrunning clutch 261 (as well as the second and third overrunning clutches 265, 276, disclosed in further detail herein). The sprag clutch 300 includes an outer race 302, an inner race 304, and a plurality of movable sprags 306 (one of which is referenced in FIGS. 3A and 3B) disposed between the outer race 302 and the inner race 304. In this example, the first output shaft 260 (which is powered by the accessory gearbox 252) is coupled to the outer race 302 and the compressor shaft 251 is coupled to the inner race 304. The sprags 306 are pivotable about their centers (extending into the page). FIG. 3A shows the sprag clutch 300 in the engaged or locked state. In FIG. 3A, the outer race 302 is rotating in the clockwise direction. This occurs, for example, during the first mode of operation when the accessory gearbox 252 is driving the compressor 204. The interaction between the outer race 302 and the sprags 306 causes the sprags 306 to pivot into and engage the inner race 304. As a result, the outer race 302, the sprags 306, and the inner race 304 all rotate together (in the clockwise direction in FIG. 3A). Therefore, when the first output shaft 260 rotates the outer race 302, the outer race 302 rotates the inner race 304 and, thus, rotates the compressor shaft 251 in the same direction.

FIG. 3B shows the sprag clutch 300 in the disengaged or overriding state. In FIG. 3B, the inner race 304 is rotating in the clockwise direction independent of (faster than) the outer race 302. This occurs, for example, during the second mode of operation when the turbine 208 is instead driving the compressor shaft 251 (as disclosed in further detail herein). As shown in FIG. 3B, the inner race 304 slides along the inner surfaces of the sprags 306. However, this interaction does not cause the sprags 306 to frictionally engage the outer race 302. As such, the inner race 304 rotates in the clockwise direction without causing rotation of the outer race 302. If the outer race 302 is rotated up to a speed that matches the rotational speed of the inner race 304, the sprags 306 are pivoted into the inner race 304 and the outer race 302 eventually overdrives the inner race 304. As such, the inner race 304 rotates at least as fast as the outer race 302. Conversely, while the outer race 302 is rotating, the inner race 304 can rotate independently at a faster rotational speed than the outer race 302, which does not affect the outer race 302. Referring back to FIG. 2, the first overrunning clutch 261 advantageously enables the accessory gearbox 252 to drive the compressor 204 in the first mode of operation while enabling the turbine 208 to drive the compressor 204 in the second mode of operation without driving the accessory gearbox 252. This type of overrunning clutch also advantageously operates without requiring any power or actuating mechanisms.

In FIG. 2, the system 200 is operating in the first mode of operation in which the first engine 108 mechanically powers the compressor 204. In particular, the first engine 108 is operating, which powers the accessory gearbox 252 (via the radial drive shaft 206). The first engine 108 can be operating at a relatively high speed (a high revolutions-per-minute (RPMs)), such as during take-off, climb, and/or cruise. As a result, the first output shaft 260 is rotating at a relatively high speed. As such, the first overrunning clutch 261 is engaged, thereby transferring rotational power from the first output shaft 260 to the compressor shaft 251. The compressor 204 increases the pressure of the air provided at the compressor inlet 240 to a higher pressure at the compressor outlet 242. The pressurized air is provided via the second passageway 247 to the ECS 202 and/or the one or more other systems that received pressurized air.

The ECS 202 and/or one or more other systems are fluidly coupled to the second passageway 247 to receive the pressurized air generated by the compressor 204. In some examples, a fourth valve 263 is disposed upstream of the ECS 202 to control the flow of pressurized air from the second passageway 247 to the ECS 202. Similarly, one or more other valve(s) can be disposed upstream from the other system(s) to control the flow of pressurized air to the respective system(s).

In some examples, a second pressurized air system (similar to the system 200) is implemented in connection with the second engine 110 to produce high pressure air. The pressurized air from the second system is combined with the pressurized air from the system 200 and provided to the ECS 202 and/or the one or more other systems. In the illustrated example, a fifth valve 264 controls the flow of pressurized air from the second system of the second engine 110 to the second passageway 247, which supplies the pressurized air to the ECS 202 and/or the one or more other systems.

In the illustrated example, the system 200 includes a second overrunning clutch 265 operatively coupled between the compressor 204 and the turbine 208. In particular, the turbine 208 includes a turbine shaft 266, which is operatively coupled to the compressor shaft 251 via the second overrunning clutch 265. The second overrunning clutch 265 can be implemented as a sprag clutch, such as the sprag clutch 300 shown in FIGS. 3A and 3B. For example, the turbine shaft 266 can be coupled to the outer race and the compressor shaft 251 can be coupled to the inner race. As such, the second overrunning clutch 265 enables the compressor shaft 251 to rotate faster than the turbine shaft 266.

Thus, in the first mode of operation, the second overrunning clutch 265 is disengaged (as indicated by the stippling), whereby the compressor shaft 251 rotates without driving the turbine 208. Therefore, power is not wasted by driving the turbine 208 when the turbine is not being used. In the first mode of operation, the turbine 208 can be off (e.g., no rotation of the turbine shaft 266).

In the illustrated example, the turbine 208 includes a turbine inlet 268 and a turbine outlet 269. The turbine inlet 268 is to receive air from a second air source 267. The second air source 267 can be a high pressure air source, such as a bleed air from the gas turbine engine 210. In this example, the second air source 267 is bleed air from the second compressor 226 (the HPC) of the gas turbine engine 210. In the illustrated example, a fourth passageway 270 fluidly couples the turbine inlet 268 to a bleed air port 271 of the second compressor 226 (the HPC). As such, the fourth passageway 270 can route high pressure bleed air from the second compressor 226 to the turbine inlet 268. In the illustrated example, the fourth passageway 270 receives bleed air from a final discharge stage of the second compressor 226. However, in other examples, the second air source 267 can be air from another air source (e.g., a lower stage compressor). For example, the fourth passageway 270 can be fluidly coupled to another port on the gas turbine engine 210 to receive bleed air from a lower stage (e.g., an intermediate stage) of the second compressor 226 and/or from a stage from the first compressor 224.

In the illustrated example, a sixth valve 272 and a seventh valve 273 are coupled to the fourth passageway 270 to control the flow of air through the fourth passageway 270 to the turbine inlet 268. The sixth valve 272 and the seventh valve 273 are referred to herein as a first turbine inlet valve 272 and a second turbine inlet valve 273, respectively. When the system 200 is operating in the first mode of operation, as shown in FIG. 2, the first and second turbine inlet valves 272, 273 are closed. In the illustrated example, a fifth passageway 274 fluidly couples the turbine outlet 269 to a downstream location. Thus, when the turbine 208 is operating (as disclosed in further detail in connection with FIG. 4), the fifth passageway 274 can direct the air exiting the turbine outlet 269 to another location. In some examples, the fifth passageway 274 directs the air exiting the turbine outlet 269 to the fan duct 216 for thrust recovery. For example, the fifth passageway 274 can be coupled to a port in the nacelle 214 to direct the air into the fan duct 216.

In the illustrated example, the turbine 208 is also operatively coupled to a second output shaft 275 of the accessory gearbox 252, which may be referred a starter input for the accessory gearbox 252. Similar to the first output shaft 260, the second output shaft 275 is mechanically coupled via a gear train in the accessory gearbox 252 to the radial drive shaft 206. In a third mode of operation, which is disclosed in further detail herein, the turbine 208 can be used to start the first engine 108 by driving the second output shaft 275, which powers the accessory gearbox 252, which drives the radial drive shaft 206 and, thus, rotates the second drive shaft 232 of the first engine 108.

In the illustrated example, the system 200 includes a third overrunning clutch 276 operatively coupled between the second output shaft 275 of the accessory gearbox 252 and the turbine 208. In this example, a first gear 278 is coupled to the turbine shaft 266. The first gear 278 is engaged (e.g., meshed) with a second gear 279. The second gear 279 is coupled to a planetary gearbox 280 via an input drive shaft 281. The planetary gearbox 280 reverses the direction of rotation between the input drive shaft 281 and an output drive shaft 282. The output drive shaft 282 is coupled to the second output shaft 275 of the accessory gearbox 252 via the third overrunning clutch 276. The third overrunning clutch 276 can be implemented as a sprag clutch, such as the sprag clutch 300 shown in FIGS. 3A and 3B. In such an example, the output drive shaft 282 is coupled to the outer race, and the second output shaft 275 is coupled to the inner race. As such, the third overrunning clutch 276 is configured such that the second output shaft 275 can rotate faster than the output drive shaft 282. Thus, in the first mode of operation, the third overrunning clutch 276 is disengaged (as indicated by the stippling) and, thus, the second output shaft 275 can rotate freely without rotating the output drive shaft 282 (and, thus, the turbine 208). Therefore, when the first engine 108 is running and the second output shaft 275 is rotating, the second output shaft 275 is operatively disconnected from the turbine 208. While the first, second, and third overrunning clutches 261, 265, 276 are disclosed as being implemented as sprag clutches, in other examples, the first, second, and/or third overrunning clutches 261, 265, 276 can be implemented by other types of overrunning clutches, such as a roller ramp clutch, a wrap spring clutch, or a wedge style clutch.

In the illustrated example, the system 200 includes a sixth passageway 284 between the second passageway 247 and the fourth passageway 270. The sixth passageway 284 can be used to provide high pressure air to the turbine 208 during the third mode of operation (the engine starter mode), which is disclosed in further detail in connection with FIG. 5. An eighth valve 285, referred to herein as a turbine starter valve 285, is coupled to the sixth passageway 284 to control the flow of air through the sixth passageway 284. In the first mode of operation, as shown in FIG. 2, the turbine starter valve 285 is closed. In some examples, an APU 286 is fluidly coupled to the sixth passageway 284, via the second passageway 247, to supply high pressure air for starting the first engine 108, as disclosed in further detail in connection with FIG. 5. A ninth valve 287 controls the flow of air from the APU 286 to the second passageway 247.

In the illustrated example, a seventh passageway 290 fluidly couples the second passageway 247 to a downstream location. The seventh passageway 290 is fluidly coupled to the second passageway 247 via part of the third passageway 249. The seventh passageway 290 can also be used during the starting mode to reduce the load of the compressor 204 on the turbine 208, as disclosed in further detail in connection with FIG. 5. A tenth valve 292, which is referred to herein as a fan duct inlet valve 292, is coupled to the seventh passageway 290. In the first mode of operation, the fan duct inlet valve 292 is closed. Any of the example valves 245, 248, 250, 263, 264, 272, 273, 285, 287, 292 can be implemented as a valve that operates between an open and closed state (e.g., an isolation valve) and/or performs pressure reducing functions (e.g., a pressure reducing shut-off valve, a pressure relief valve, etc.).

The example system 200 includes a control system 293 to operate the various instruments (e.g., the valves) and control the operation of the system 200 in the various modes. The control system 293 can be implemented by a controller or processor, for example. The control system 293 is communicatively coupled to the valves 245, 248, 250, 263, 264, 272, 273, 285, 287, 292 and one or more sensors that monitor various parameters of the system 200.

In the illustrated example, the control system 293 includes an input/output module 294, a comparator 295, and an instrument controller 296. The input/output module 294 receives signals from one or more sensors measuring one or more parameters of the system 200. The comparator 295 compares the measured values of the parameter(s) to one or more thresholds or threshold ranges. Based on whether the parameter(s) satisfy the thresholds or threshold ranges, the instrument controller 296 can operate one or more of the valve(s) 245, 248, 250, 263, 264, 272, 273, 285, 287, 292 to switch the system 200 between the first mode of operation and the second mode of operation.

For example, a first sensor 298a measures the speed (RPMs) of the second drive shaft 232 (the high speed spool, N2) of the gas turbine engine 210. The first sensor 298a provides signals (corresponding to the speed of the second drive shaft 232) to the control system 293 via the input/output module 294. If the first engine 108 is operating at a medium or high speed, such as during take-off, climb, or cruise, the second drive shaft 232 is rotating at a speed that provides sufficient power to the compressor 204. However, if the first engine 108 is operating at a lower speed, such as during descent or idle, the second drive shaft 232 may not be rotating fast enough to provide sufficient power to the compressor 204 to produce enough pressurized air to meet the demands of the ECS 202 and/or the other system(s). The comparator 295 can compare the speed measured by the first sensor 298a to a speed threshold or range provided, for example, by a look-up table. If the speed falls outside of the range (e.g., below a threshold speed), the instrument controller 296 of the control system 293 may cause one or more of the valve(s) 245, 248, 250, 263, 264, 272, 273, 285, 287, 292 to open or close to switch to the second mode of operation, as disclosed in further detail below, where the turbine 208 is instead used to power the compressor 204.

Additionally or alternatively, the control system 293 can monitor one or more other parameters. For example, a second sensor 298b is coupled to the second passageway 247 downstream of the of the compressor outlet 242. The second sensor 298b can measure pressure and/or flow of the pressurized air generated by the compressor 204. The second sensor 298b provides signals (corresponding to the measured pressure and/or flow of the air) to the control system 293 via the input/output module 294. The control system 293 can determine if the downstream pressure and/or flow measured by the second sensor 298b is within a predetermined pressure range (e.g., a threshold pressure, a pressure demand) for a given altitude, aircraft speed, passenger count, icing condition or any other condition affecting the operation of the aircraft system 200. The comparator 295 can compare the signal(s) provided by the second sensor 298b with a pressure and/or flow threshold or range provided, for example, by a look-up table. If the pressure and/or flow falls outside of the range (e.g., below the threshold pressure or threshold flow), the instrument controller 296 of the control system 293 may cause one or more of the valve(s) 245, 248, 250, 263, 264, 272, 273, 285, 287, 292 to open or close to switch to the second mode of operation. In another example, the control system 293 can monitor the speed of the compressor shaft 251 via a third sensor 298c. Similar to the parameters above, the control system 293 can compare the speed measured by the third sensor 298c to a threshold or range and determine whether to switch between the first and second modes of operation.

In an example operation, the system 200 is operating in the first mode of operation where the radial drive shaft 206 is used to power the compressor 204 during a first flight segment or condition such as, for example, during cruise. In some examples, powering the compressor 204 via the radial drive shaft 206 is more efficient than powering the compressor 204 via the turbine 208. The ratio between the first and second gears 256, 258 and the gears within the accessory gearbox 252 may be selected to provide sufficient power to the compressor 204 during cruise, which often accounts for a majority of the flight mission and, thus, decreases fuel consumption. However, because the radial drive shaft 206 is in a fixed gear relationship with the second drive shaft 232, the radial drive shaft 206 may not be able to provide sufficient power to the compressor 204 when the first engine 108 is operating in a second flight segment or condition such as, for example, during idle or during descent. At idle or descent the first engine 108 is operating at a slower speed than during cruise. In such a condition, the radial drive shaft 206 may not provide sufficient power to the compressor 204 to meet the demands of the system(s) that utilize the pressurized air. For example, the second drive shaft 232 (the high speed spool) may be rotating at 13,000 RPMs, and the first output shaft 260 and the compressor drive shaft 251 are only rotating at 26,000 RPMs. Therefore, the system 200 can be switched from the first mode of operation to the second mode of operation where the turbine 208 is employed to drive the compressor shaft 251 and, thus, to drive the compressor 204 to provide pressurized air to the system(s) of the aircraft 100. If the control system 293 determines the one or more parameters do not meet their corresponding thresholds (e.g., the speed of the first engine 108 is lower than a threshold) and/or the compressor 204 is otherwise not providing sufficient pressurized air to the system(s), the control system 293 operates one or more of the valve(s) 245, 248, 250, 263, 264, 272, 273, 285, 287, 292 to switch the system 200 from the first mode of operation to the second mode of operation.

Figure 4:
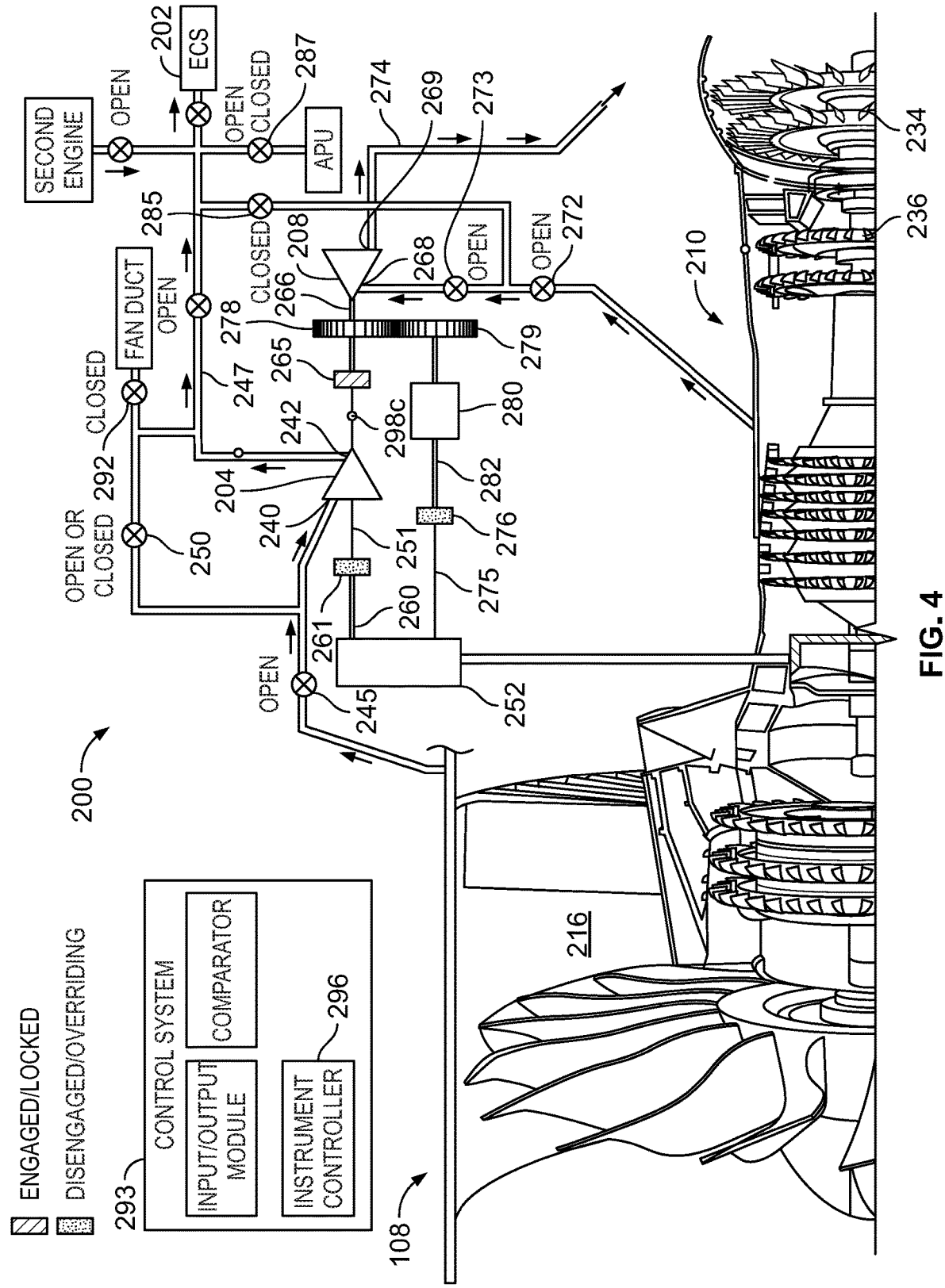
FIG. 4 shows the schematic illustration of the example pressurized air system of FIG. 2 operating in a second mode of operation in which a turbine is used to power the compressor to produce pressurized air.

FIG. 4 shows an example in which the system 200 is operating in the second mode of operation and the turbine 208 is used to power the compressor 204. To switch from the first mode of operation to the second mode of operation, the instrument controller 296 of the control system 293 transmits command signals to open the first and second turbine inlet valves 272, 273. While in the illustrated example two turbine inlet valves are utilized, in other examples, only one of the turbine inlet valves may be utilized (e.g., only the first turbine inlet valve 272). When the first and second turbine inlet valves 272, 273 are opened, high pressure bleed air from the second compressor 226 (the HPC) is supplied to the turbine inlet 268, as shown by the arrows. The turbine 208 may be, for example, a variable geometry radial inflow turbine. The high pressure bleed air drives the turbine 208, which, in turn, drives the compressor 204. In particular, the turbine 208 converts thermal energy provided by the bleed air into mechanical energy by expanding the hot, high-pressure bleed air to a lower temperature and pressure. In this situation, the turbine shaft 266 is rotating faster than the first output shaft 260 of the accessory gearbox 252. For example, while the first output shaft 260 is rotating at 26,000 RPMs, the turbine drive shaft 266 may be rotating at 40,000 RPMs. As such, when the speed of the turbine shaft 266 reaches the speed of the compressor shaft 251, the second overrunning clutch 265 switches to the engaged or locked state (as indicated by the cross-hatching), which enables the turbine shaft 266 to drive the compressor shaft 251. The turbine 208 then begins powering the compressor 204 and, thus, the turbine 208 and the compressor 204 form a turbo-compressor. Also, the compressor shaft 251 begins rotating faster than the first output shaft 260. For example, the turbine shaft 266 can be driving the compressor shaft 251 at 40,000 RPMs, while the first output shaft 260 is rotating at 26,000 RPMs. As such, the first overrunning clutch 261 is disengaged (as indicated by the stippling), which enables the compressor shaft 251 to rotate independent of (faster than) the first output shaft 260. Therefore, the compressor shaft 251 does not drive the first output shaft 260.

As disclosed above, in the second mode of operation, the turbine 208 powers the compressor 204. The compressor 204 generates pressurized air at the compressor outlet 242, which is supplied via the second passageway 247 to the ECS 202 and/or the one or more other systems. In the second mode of operation, the first valve 245 remains open to enable fan air to flow to the compressor inlet 240. The third valve 250 can be opened or closed depending on the desired temperature of the pressurized air. The turbine starter valve 285, the ninth valve 287, and the fan duct inlet valve 292 remain closed.

In some examples, the first turbine inlet valve 272 is an isolation valve that operates between open and closed states and the second turbine inlet valve 273 is a pressure-reducing shutoff valve (PRSOV) that can regulate the pressure of the bleed air flowing to the turbine inlet 268. Depending on the desired power to be provided to the compressor 204, the control system 293 can control the second turbine inlet valve 273 to regulate the pressure to a desired pressure that generates a target speed at the turbine shaft 266. In this manner, the control system 293 can control the power provided to the compressor 204 and, thus, control the pressure and flow of the air produced at the compressor outlet 242. The two valve configuration also provides redundancy in the system if one of the first or second turbine inlet valves 272, 273 becomes inoperable (e.g., fails open).

In the illustrated example, the air exiting the turbine outlet 269 is directed, via the fifth passageway 274, into the fan duct 216 for thrust recovery. Additionally or alternatively, the air exiting the turbine outlet 269 can be delivered to one or more other locations, such as to a thermal anti-icing system (e.g., an engine anti-icing system, a wing anti-icing system) and/or to the turbines 234, 236 and/or the casing of the gas turbine engine 210 engine to help cool the first engine 108. Cooling the casing and/or the turbine blades, for example, maintains a proper clearance or spacing between the turbine blades and the casing (e.g., prevents shrinkage and/or expansion due to elevated temperatures). In some examples, one or more valves may be disposed in the fifth passageway 274 to regulate a pressure and/or provide fluid shut-off.

When the system 200 is operating in the second mode, the turbine shaft 266 is rotating the output drive shaft 282 (via the first and second gears 278, 279 and the planetary gearbox 280). However, due to the gear reduction occurring in the planetary gearbox 280, the output drive shaft 282 is rotating at a lower speed than the second output shaft 275 of the accessory gearbox 252. For example, the second output shaft 275 of the accessory gearbox 252 can be rotating at 13,000 RPMs, while the output drive shaft 282 is rotating at 3,300 RPMs. As such, the third overrunning clutch 276 is disengaged (as indicated by the stippling), which enables the second output shaft 275 to rotate independently of (faster than) the output drive shaft 282. Therefore, the turbine 208 does not drive the second output shaft 275 while the system 200 is operating in the second mode of operation.

The control system 293 continues to monitor the one or more parameters of the first engine 108 and/or the system 200. If the control system 293 determines the system 200 can be switched back to the first operating mode, the control system 293 closes the first and second turbine inlet valves 272, 273, thereby shutting down the turbine 208. Then, the first overrunning clutch 261 reengages and the accessory gearbox 252 begins to drive the compressor 204, as shown in the first mode of operation in FIG. 2. As such, the control system 293 can monitor the one or more parameter(s) and switch back-and-forth between the first mode of operation (FIG. 2) and the second mode of operation (FIG. 4) to ensure a consistent supply of pressurized air is available to meet the demands of the ECS 202 and/or the one or more other systems.

Figure 5:
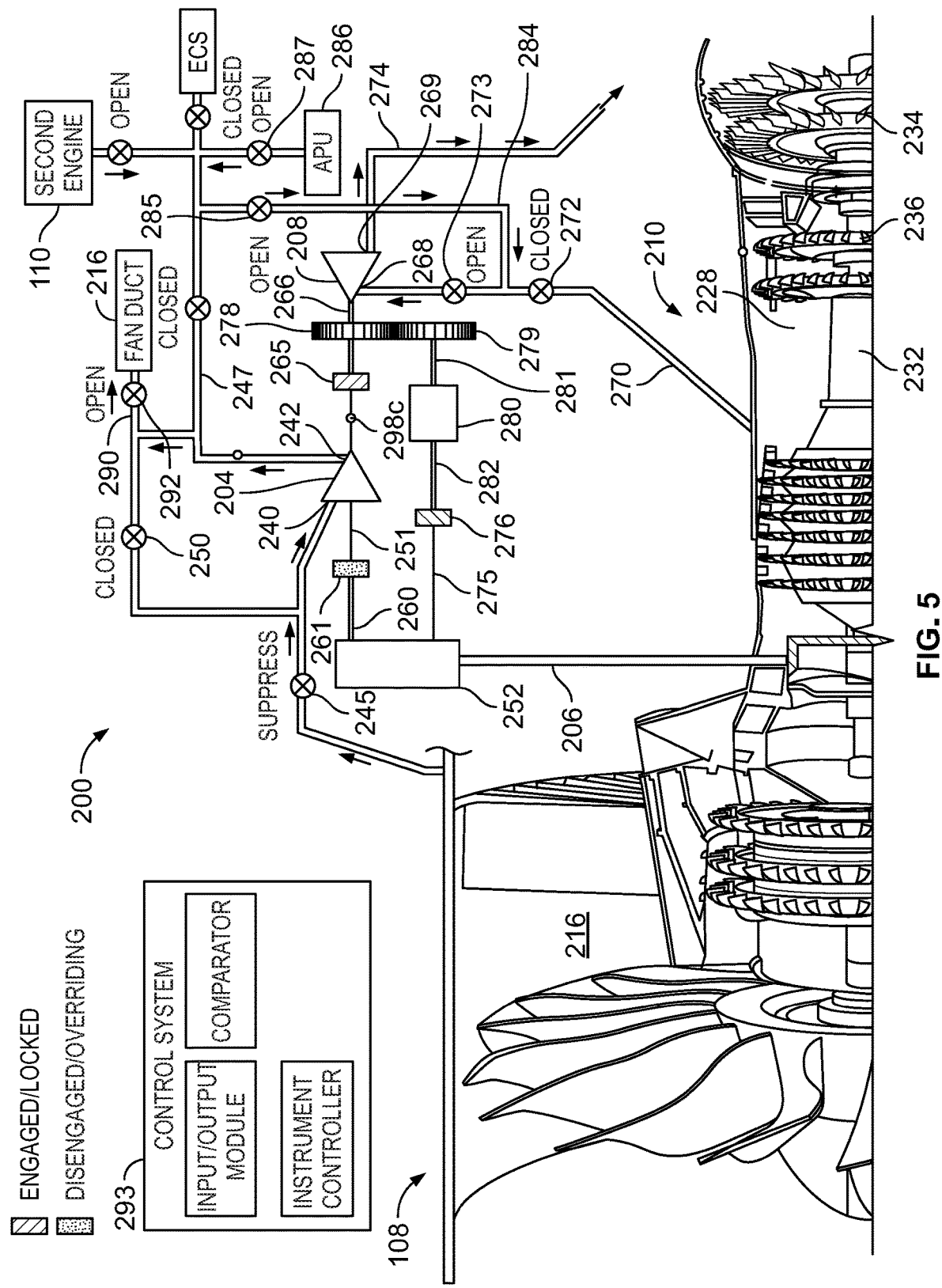
FIG. 5 shows the schematic illustration of the example pressurized air system of FIG. 2 operating in a third mode of operation in which the turbine is used to start the engine.

As shown in FIG. 5, the system 200 can also operate in the third mode of operation (the engine starter mode) in which the turbine 208 is used to start the first engine 108. In the third mode of operation, the first valve 272 is closed. To start the first engine 108, high pressure air is provided to the turbine inlet 268 to drive the turbine 208, which powers the accessory gearbox 252, thereby driving the radial drive shaft 206 and, thus, driving the second drive shaft 232 of the first engine 108. In some examples, the high pressure air to drive the turbine 208 is provided by the APU 286. In such an example, the ninth valve 287 is open, which enables high pressure air to flow through the second passageway 247 to the sixth passageway 284, and from the sixth passageway 284 through the fourth passageway 270 to the turbine inlet 268. The second valve 248 is closed, the first turbine inlet valve 272 is closed, and the second turbine inlet valve 273 is open. Additionally or alternatively, high pressure air may be provided by the second engine 110. For example, if the second engine 110 is started first, then the high pressure air created by the second engine 110 can be provided to the first engine 108 (sometimes referred to as cross-flow bleed systems). In other examples, the high pressure air can be supplied by one or more other sources, such as a ground cart or stored in a high pressure airflask onboard or remote from the aircraft 100 (FIG. 1).

The high pressure air provided to the turbine inlet 268 drives the turbine shaft 266. The turbine shaft 266 drives the output drive shaft 282 (via the first and second gears 278, 279, the input drive shaft 281, and the planetary gearbox 280). The planetary gearbox 280 can be configured to reduce the RPMs from the turbine shaft 266 to the output drive shaft 282 and, thus, to the second output shaft 275 of the accessory gearbox 252. For example, the planetary gearbox 280 can provide a 12:1 gear ratio. As such, when the turbine shaft 266 is rotating at 40,000 RPMs, for example, the output drive shaft 282 (and, thus, the second output shaft 275) is rotating at approximately 3,300 RPMs. The third overrunning clutch 276 is engaged (as indicated by the cross-hatching). As such, the output drive shaft 282 rotates the second output shaft 275 of the accessory gearbox 252. The accessory gearbox 252, in turn, drives the radial drive shaft 206 and, thus, rotates the second drive shaft 232 (the high speed spool, N2) of the first engine 108. Once the second drive shaft 232 (the high speed spool) is spinning, fuel is mixed in the combustion chamber 228 and a spark is provided to ignite the mixture and start the gas turbine engine 210. Once the gas turbine engine 210 is running, the turbine starter valve 285 and the ninth valve 287 can be closed and the second valve 248 can be opened.

During the third mode of operation, the expanded air exiting the turbine outlet 269 can be supplied, via the fifth passageway 274, to the fan duct 216 for thrust recovery. Additionally or alternatively, as disclosed above, the air exiting the turbine outlet 269 can be provided to one or more other locations, such as to a thermal anti-icing system (e.g., an engine anti-icing system, a wing anti-icing system) and/or to the turbines 234, 236 and/or the casing of the gas turbine engine 210.

In the third mode of operation, the second overrunning clutch 265 is engaged (as indicated by the cross-hatching). As such, the turbine shaft 266 is driving the compressor shaft 251 and, thus, the turbine 208 is driving the compressor 204. To reduce the load on the turbine 208 caused by the compressor 204, the control system 293 can command the first valve 245 to reduce (suppress) the amount of air flow to the compressor inlet 240. For example, the first valve 245 can be a PRSOV that can reduce the flow or pressure of the air flow to a lower flow or pressure. As such, less air flow is provided to the compressor inlet 240. Additionally or alternatively, the compressor 204 can include variable geometry features such as adjustable inlet guide vanes and/or diffuser guide vanes to achieve lower air flow and/or pressure at the compressor outlet 242. In this example, the third valve 250 can be closed.

To help further reduce the load on the turbine 208, the fan duct inlet valve 292 can be open. In some examples, the fan duct inlet valve 292 is a surge valve. As disclosed above, the seventh passageway 290 is fluidly coupled to a downstream location, such as the fan duct 216. As such, the air exiting the compressor outlet 242 flows through the second passageway 247, through the seventh passageway 290, and to the fan duct 216 for thrust recovery. Therefore, the seventh passageway 290 fluidly couples the second passageway 247 to the fan duct 216. In other examples, the seventh passageway 290 can direct the airflow to another location, such as overboard the aircraft 100. By directing the outlet air to a low pressure area and suppressing the compressor inlet air, minimal load is induced by the compressor 204 on the turbine 208. Once the first engine 108 is running, the control system 293 closes the fan duct inlet valve 292.

During the third mode of operation, the compressor shaft 251 is rotating faster than the first output shaft 260 of the accessory gearbox 252. As such, the first overrunning clutch 261 is disengaged (as indicated by the stippling).

Figure 6:
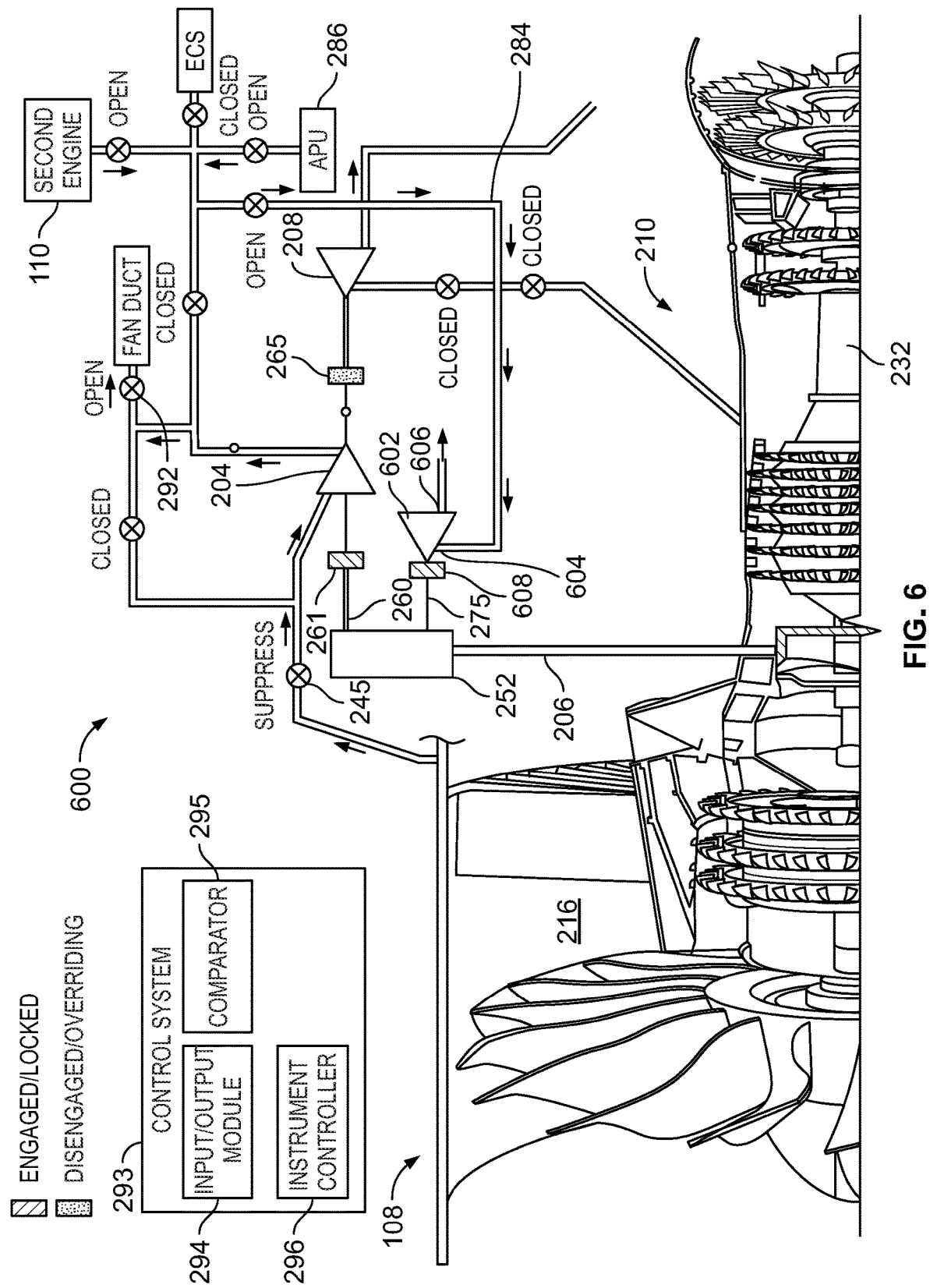
FIG. 6 is a schematic illustration of an example pressurized air system that includes a separate starter turbine to start the aircraft engine.

FIG. 6 illustrates another example pressurized air system 600 (referred to herein as the system 600) constructed in accordance with the teachings of this disclosure. The example system 600 is also illustrated in connection with the first engine 108. Those components of the example system 600 that are substantially similar or identical to the components of the example system 200 disclosed above in connection with FIGS. 2-5 and that have functions substantially similar or identical to the functions of those components will not be described in detail again below. Instead, the interested reader is referred to the above corresponding descriptions. To facilitate this process, the same reference numbers are used for like structures.

In FIG. 6, the system 600 utilizes a separate starter turbine 602 to start the first engine 108 rather than using the turbine 208. In the illustrated example, the starter turbine 602 is coupled to the second output shaft 275 of the accessory gearbox 252. The sixth passageway 284 is coupled to a turbine inlet 604 of the starter turbine 602. In the third mode of operation (the engine starter mode), high pressure air from the APU 286 and/or the second engine 110 is supplied to the turbine inlet 604 to drive the starter turbine 602. The starter turbine 602 drives the second output shaft 275, which powers the accessory gearbox 252, which drives the radial drive shaft 206 and, thus rotates the second drive shaft 232 to start the gas turbine engine 210. The air exiting a turbine outlet 606 of the starter turbine 606 can be directed into the fan duct 216 for thrust recovery and/or directed to another location. In the illustrated example, an overrunning clutch 608 is disposed between the starter turbine 602 and the second output shaft 275 so that once the first engine 108 is started and running, the starter turbine 602 can be disconnected from the second output shaft 275.

During the third mode of operation, the turbine 208 is off or not operating, and the second overrunning clutch 265 is disengaged. The first output shaft 260 is driving the compressor 204 via the first overrunning clutch 261. However, the load can be reduced by suppressing the airflow to the compressor 204 with the first valve 245 and the air exiting the compressor 204 can be dumped overboard or into the fan duct 216 via the fan duct inlet valve 292.

Figure 7:
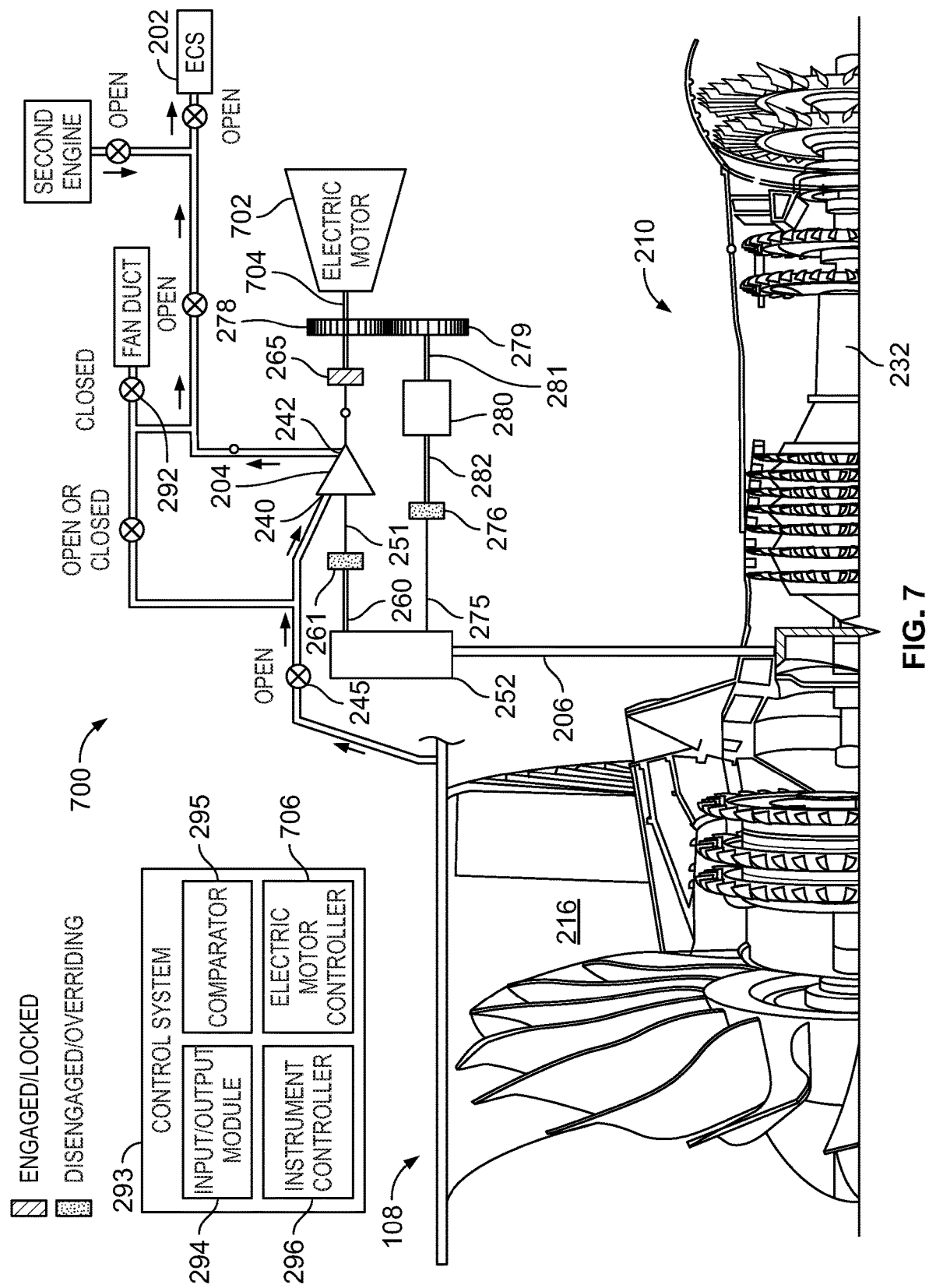
FIG. 7 is a schematic illustration of an example pressurized air system that includes an electric motor to power a compressor and/or start the engine of the aircraft.

FIG. 7 illustrates another example pressurized air system 700 (referred to herein as the system 700) constructed in accordance with the teachings of this disclosure. The example system 700 is also illustrated in connection with the first engine 108. Those components of the example system 700 that are substantially similar or identical to the components of the example system 200 disclosed above in connection with FIGS. 2-5 and that have functions substantially similar or identical to the functions of those components will not be described in detail again below. Instead, the interested reader is referred to the above corresponding descriptions. To facilitate this process, the same reference numbers are used for like structures.

In the example system 700 of FIG. 7, the turbine 208 (FIG. 2) has been replaced with an electric motor 702 and the turbine shaft 266 (FIG. 2) has been replaced with an electric motor drive shaft 704 of the electric motor 702. The system 700 can operate substantially the same as the system 200 disclosed above. In particular, the system 700 can operate between a first mode of operation and a second mode of operation to power the compressor 204 to produce pressurized air. The system 700 is shown in FIG. 7 as operating in the second mode.

In the first mode of operation, the accessory gearbox 252 drives the compressor 204, similar to the operation disclosed above in connection with FIG. 2. In the first mode of operation, the first overrunning clutch 261 is engaged and the second and third overrunning clutches 265, 276 are disengaged. The control system 293 can monitor one or more parameters of the system 700. If more power is desired, the control system 293 can operate one or more instruments of the system 700 to switch to the second mode of operation. The control system 293 includes an electric motor controller 706 for controlling the electric motor 702. If more power to the compressor 204 is desired, the electric motor controller 706 activates the electric motor 702, which drives the electric motor drive shaft 704. When the electric motor drive shaft 704 reaches the speed of the compressor shaft 251, the second clutch 265 engages, thereby enabling the electric motor 702 to power the compressor 204. Also, once the compressor shaft 251 is rotating faster than the first output shaft 260, the first overrunning clutch 261 disengages. As such, the electric motor 702 can be used to power the compressor 204 independent of the accessory gearbox 252. To switch back to the first mode of operation, the electric motor controller 706 can deactivate the electric motor 702. Thus, similar to the system 200 disclosed above, the system 700 can switch between the first mode of operation and the second mode of operation depending on the operating conditions of the first engine 108 and the pressure and flow of pressurized air demanded by the ECS 202 and/or the one or more other system(s).

In addition, the electric motor 702 can be used in a third mode of operation to start the first engine 108. In particular, to start the first engine 108, the electric motor controller 706 activates the electric motor 702 to drive the electric motor drive shaft 704. The electric motor drive shaft 704 drives the output drive shaft 282 (via the first and second gears 278, 279, the input drive shaft 281, and the planetary gearbox 280). The third overrunning clutch 276 engages, which enables the output drive shaft 282 to drive the second output shaft 275, which drives the accessory gearbox 252, the radial drive shaft 206, and the second drive shaft 232 of the gas turbine engine 210. Similar to the technique disclosed in connection with FIG. 5, the load caused by the compressor 204 can be reduced by suppressing the airflow to the compressor 204 with the first valve 245 and the air exiting the compressor 204 can be directed into the fan duct 216 or directed to another location via the fan duct inlet valve 292.

Figure 8:
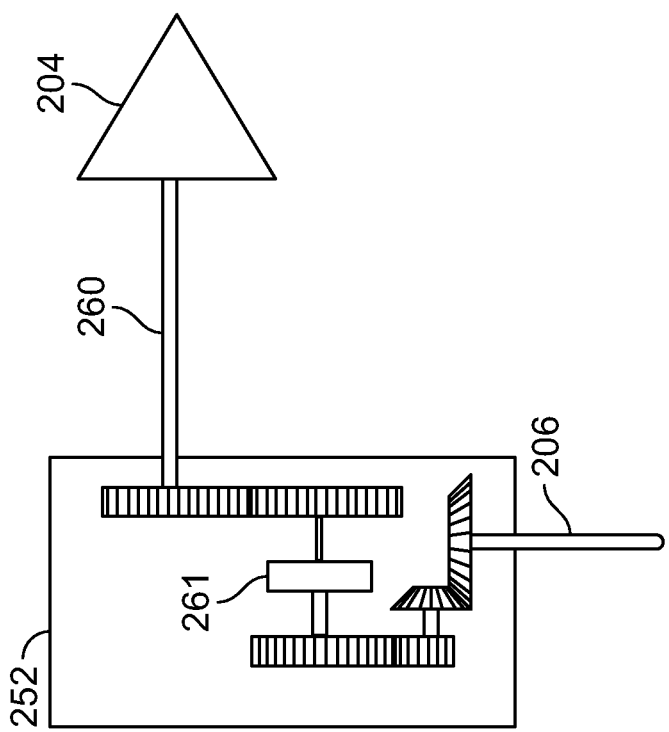
FIG. 8 illustrates an alternative arrangement of a first overrunning clutch that may be implemented in connection with any of the systems of FIGS. 2, 6, and 7.

While in the example systems 200, 600, 700 of FIGS. 2, 6, and 7, the first overrunning clutch 261 is disposed between the compressor 204 and the accessory gearbox 252, in other examples the first overrunning clutch 261 can be incorporated into the accessory gearbox 252. For example, FIG. 8 shows an example arrangement in which the first overrunning clutch 261 is disposed between two or more gears in the accessory gearbox 252. In this example, the compressor 204 can be coupled directly to the first output shaft 260 (or, it may be considered that the compressor shaft 251 (FIG. 2) is coupled to a gear in the accessory gearbox 252). Disposing the first overrunning clutch 261 in the gear train can be used to change the torque and/or RPMs experienced by the first overrunning clutch 261 (e.g., to avoid exceeding any torque and/or RPM limits for the first overrunning clutch 261). Even though the location of the first overrunning clutch 261 has changed, the first overrunning clutch 261 still enables the compressor 204 to operate independently of (faster than) the speed provided by the radial drive shaft 206. Thus, the location of the first overrunning clutch 261 can be changed, as long as the first overrunning clutch 261 is operatively coupled between the radial drive shaft 206 and the compressor 204. The example arrangement shown in FIG. 8 can be implemented in connection with any of the example systems 200, 600, 700 disclosed herein.

Figure 9:
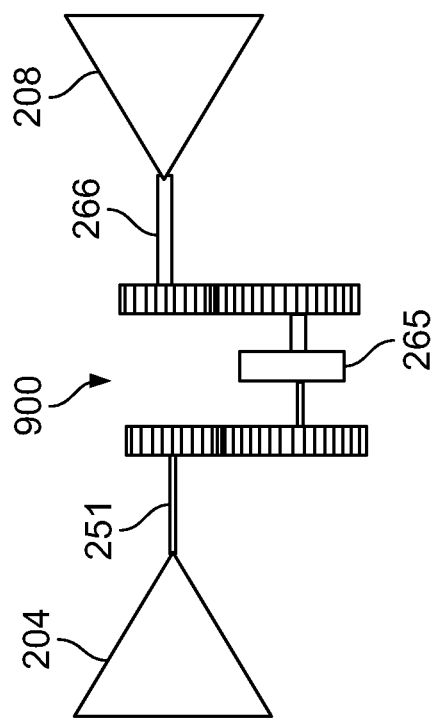
FIG. 9 illustrates an alternative arrangement of a second overrunning clutch that may be implemented in connection with any of the systems of FIGS. 2, 6, and 7.

Similarly, while in the example systems 200, 600, 700 of FIGS. 2, 6, and 7, the second overrunning clutch 265 is disposed between the compressor shaft 251 and the turbine shaft 266 (or the electric motor drive shaft 704 in FIG. 7), in other examples the second overrunning clutch 265 can be incorporated into a gear train between the compressor shaft 251 and the turbine shaft 266. For example, FIG. 9 shows an example arrangement in which the second overrunning clutch 265 is located in a gear train 900 between the compressor shaft 251 and the turbine shaft 266. The gear train 900 may be used to change the gear ratio between the compressor shaft 251 and the turbine shaft 266. Further, disposing the second overrunning clutch 265 in the gear train 900 can be used to change the torque and/or RPMs experienced by the second overrunning clutch 265 (e.g., to avoid exceeding any torque and/or RPM limits for the clutch). Even though the location of the second overrunning clutch 265 has changed, the second overrunning clutch 265 is still operatively coupled between the compressor shaft 251 and the turbine shaft 266 and, thus, enables the compressor 204 to operate independent of (faster than) the turbine 208 in the first mode of operation. The example arrangement shown in FIG. 9 can be implemented in connection with any of the example systems 200, 600, 700 disclosed herein.

The use of the terms "first," "second," "third," etc. in connection with any parts (e.g., valves, passageways, etc.) or modes is merely used to distinguish one part or mode from another part or mode. These terms are non-limiting and are not intended to indicate a specific sequence or specific number of parts or modes.

While an example manner of implementing the control system 293 of the example systems 200, 600, and 700 is illustrated in FIGS. 2, 6, and 7, one or more of the elements, processes and/or devices illustrated in FIGS. 2, 6, and 7 may be combined, divided, re-arranged, omitted, eliminated and/or implemented in any other way. Further, the example input/output module 294, the example comparator 295, the example instrument controller 296, the example electric motor controller 706 and/or, more generally, the example control system 293 of FIGS. 2, 6, and 7 may be implemented by hardware, software, firmware and/or any combination of hardware, software and/or firmware. Thus, for example, any of the example input/output module 294, the example comparator 295, the example instrument controller 296, the example electric motor controller 706 and/or, more generally, the example control system 293 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input/output module 294, the example comparator 295, the example instrument controller 296, and/or the example electric motor controller 706 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the example control system 293 of FIGS. 2, 6, and 7 may include one or more elements, processes and/or devices in addition to, or instead of, those illustrated in FIGS. 2, 6, and 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
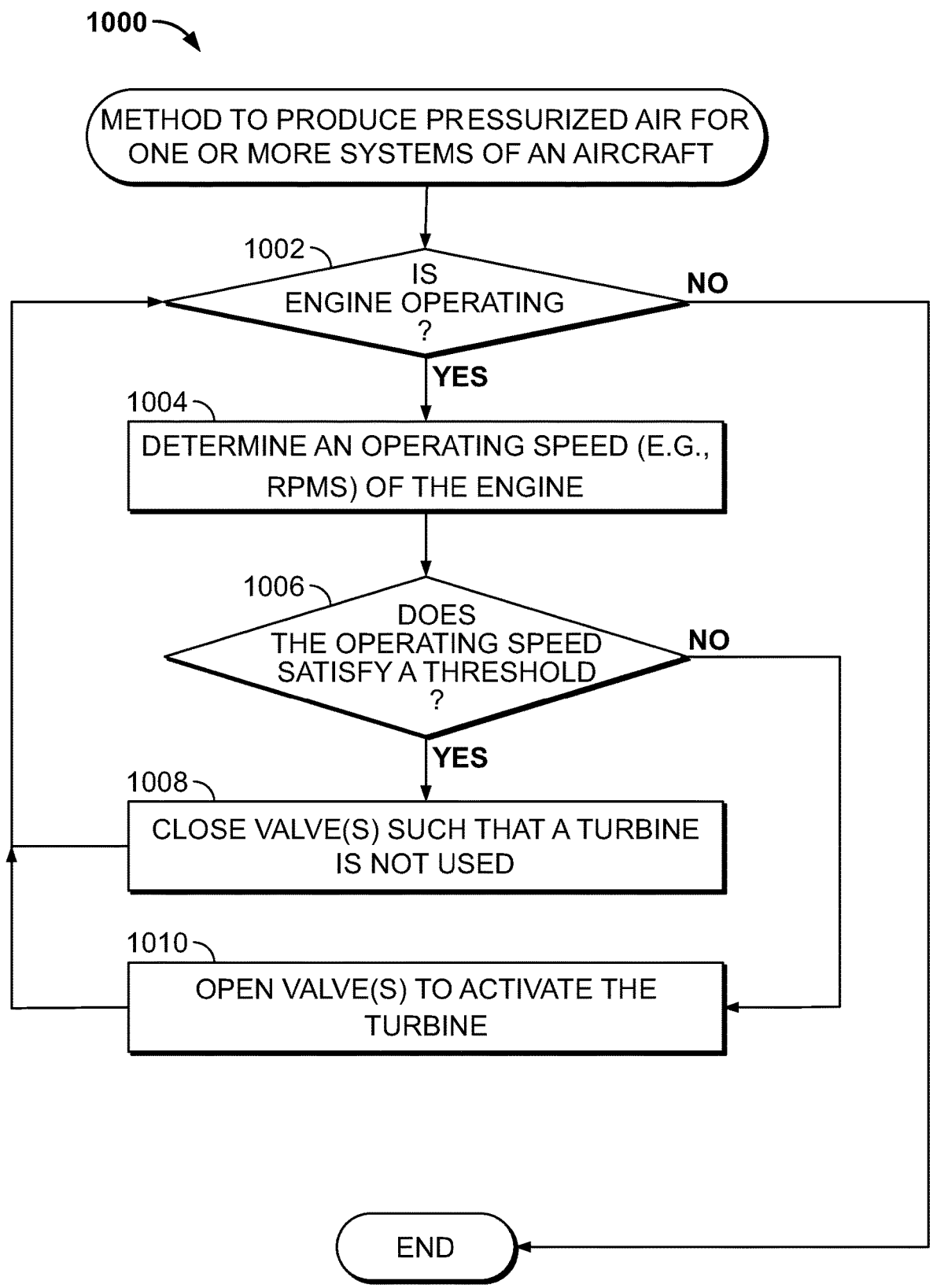
FIG. 10 is a flowchart representative of an example method of producing pressurized air for one or more systems of an aircraft that may be implemented by any of the systems of FIGS. 2, 6, and 7.
Figure 11:
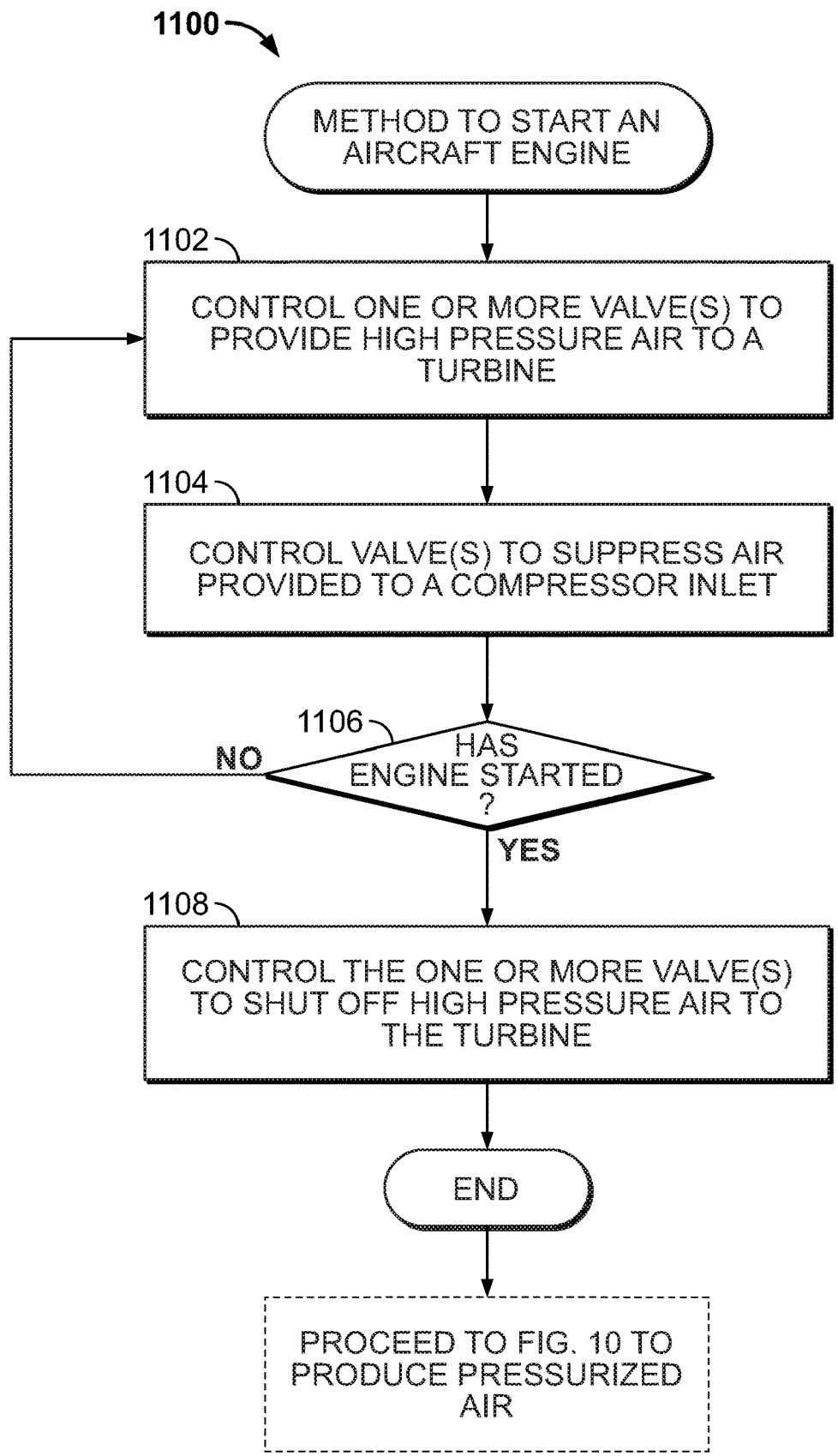
FIG. 11 is a flowchart representative of an example method of starting an aircraft engine that may be implemented by any of the systems of FIGS. 2, 6, and 7.

Flowcharts representative of example hardware logic, machine readable instructions, hardware implemented state machines, and/or any combination thereof for implementing the example control system 293 of FIGS. 2, 6, and 7 are shown in FIGS. 10 and 11. The machine readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 10 and 11, many other methods of implementing the example control system 293 of FIGS. 2, 6, and 7 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 10 and 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 10 is a flowchart representative of an example method 1000 for producing pressurized air for one or more systems of an aircraft, such as the aircraft 100, that may be implemented by any of the example systems 200, 600, 700 disclosed herein. The method 1000 can be implemented at least in part by machine readable instructions executed by the control system 293. The example method 1000 is described in connection with the example system 200 of FIGS. 2 and 4. However, it is understood that the example method 1000 could be similarly implemented in connection with the systems 600 or 700.

At block 1002, the control system 293 determines whether the first engine 108 is operating or running. The control system 293 may receive signals from one or more sensors associated with the first engine 108 (e.g., the first sensor 298*a*) and determine, based on the measurements from the sensor(s), if the first engine 108 is operating. If the first engine 108 is not operating, the aircraft 100 is not operating and, thus, pressurized air is generally not desired for the one or more systems. As such, the example method 1000 ends.

If the first engine 108 is operating, at block 1004, the control system 293 determines the operating speed (e.g., RPMs) of the first engine 108 via signals received by the input/output module 294 from the first sensor 298*a*. In this example, the first sensor 298*a* measures the speed (e.g., RPMs) of the second drive shaft 232 (the high speed spool) of the first engine 108.

At block 1006, the comparator 295 compares the operating speed to a threshold to determine whether the speed satisfies the threshold. If the engine speed satisfies the threshold (e.g., the RPMs of the second drive shaft 232 is above the threshold), the instrument controller 296 of the control system 293, at block 1008, transmits command signals to close the first and/or second turbine inlet valves 272, 273, such that bleed air is not provided to the turbine 208 and the turbine 208 is not used. If the first and second turbine inlet valves 272, 273 were previously in their closed state, the control system 293 allows the first and second turbine inlet valves 272, 273 to remain closed. As such, the system 200 is operating in the first mode of operation where the radial drive shaft 206 and the accessory gearbox 252 are powering the compressor 204. The example method 1000 repeats.

If the operating speed of the first engine 108 does not satisfy the threshold (e.g., the RPMs of the second drive shaft 232 is below the threshold), the instrument controller 296 of the control system 293, at block 1010, transmits command signals to open the first and/or second turbine inlet valves 272, 273. As a result, bleed air is provided to the turbine 208, which drives the turbine 208 to power the compressor 204. If the first and second turbine inlet valves 272, 273 were previously open, the control system 293 allows the first and second turbine inlet valves 272, 273 to remain open. As such, the system 200 is operating in the second mode of operation, where the turbine 208 powers the compressor 204. The example method 1000 repeats. The example method 1000 can run on a loop and be repeated at a certain time interval (e.g., every 10 seconds). In some examples, the control system 293 operates the second turbine inlet valve 273 to regulate the pressure of the bleed air provided to the turbine 208 to control the speed of the turbine 208 and, thus, control the power provided to the compressor 204. In some examples, the control system 293 operates the system 200 in the first mode of operation during certain flight conditions, such as during take-off, climb, and cruise, and operates the system 200 in the second mode of operation during other flight conditions, such as during descent or idle.

While in FIG. 10 the example method 1000 is described in connection with monitoring the speed of the second drive shaft 232 of the first engine 108, in other examples, the method 1000 can be similarly performed by monitoring one or more other parameters, such as the pressure or flow of air exiting the compressor outlet 242 (e.g., via the second pressure sensor 298b) and/or the speed of the compressor shaft 251 (e.g., via the third sensor 298c).

The example method 1000 can also be performed in connection with the system 700 in which the electric motor 702 is used in place of the turbine 208. In such an example, rather than opening or closing the valves (blocks 1008 and 1010), the example method 1000 includes activating or deactivating the electric motor 702 via the electric motor controller 706. While the system 700 is operating in the second mode of operation, the electric motor controller 706 can increase or decease the speed of the electric motor 702 to control the amount of pressurized air produced by the compressor 204.

FIG. 11 is a flowchart representative of an example method 1100 for starting an aircraft engine, such as the first engine 108, that may be implemented by any of the example systems 200, 600, 700 disclosed herein. The method 1000 can be implemented at least in part by machine readable instructions executed by the control system 293. The example method 1100 is described in connection with the example system 200 shown in FIG. 5 operating in the third mode of operation. However, it is understood that the example method 1100 could be similarly implemented in connection with the systems 600 or 700.

At block 1102, the instrument controller 296 of the controller system 293 controls one or more valve(s) to create a flow path that provides high pressure air to the turbine 208. For example, the instrument controller 296 sends command signals to close the second valve 248, open the turbine starter valve 285, and open the second turbine inlet valve 273, which creates a flow path for high pressure air to be provided to the turbine inlet 268. High pressure air can be provided by the other engine (e.g., the second engine 110) and/or the APU 286. In other examples, high pressure air can be provided by another source. The high pressure air drives the turbine shaft 266, which transfers power to the second output shaft 275 (via the third overrunning clutch 276), which powers the accessory gearbox 252, which drives the radial drive shaft 206, which rotates the second drive shaft 232 (the high speed spool) of the gas turbine engine 210.

In some examples, at block 1104, the instrument controller 296 of the control system 293 can control one or more of valve(s) to suppress air provided to the compressor inlet 240. For example, the instrument controller 296 sends a command signal to the first valve 245 to reduce the pressure or flow of air through the first passageway 244 to the compressor inlet 240. Additionally, the instrument controller 296 sends a command signal to open the fan duct inlet valve 292, which enables the air exiting the compressor outlet 242 to be directed into the fan duct 216 or another location (e.g., dumped overboard). This process significantly reduces the power consumed by the compressor 204 while the turbine 208 is operating.

While the second drive shaft 232 of the gas turbine engine 210 is rotating, fuel is mixed in the combustion chamber 228 and ignited to start the first engine 108. At block 1106, the control system 293 determines whether the first engine 108 has started. The control system 293 can determine if the first engine 108 has started based on measurements from one or more sensors (e.g., signals from the first sensor 298a). If the first engine 108 has not yet started, control returns to block 1102, and the control system 293 enables the high pressure flow path to remain open.

If the first engine 108 has started, at block 1108, the instrument controller 296 of the control system 293 controls the one or more valve(s) to shut off the flow of high pressure air to the turbine 208. For example, the instrument controller 296 can send a commands signal to close turbine starter valve 285. The instrument controller 296 can also send commands signal to close the fan duct inlet valve 292, open the first valve 245, and open the second valve 248. At block 1108, the example method 1110 ends. In some examples, the process proceeds to the method 1000 of FIG. 10, such that the system 200 can start providing pressurized air to the one or more system(s) of the aircraft that receive pressurized air.

The example method 1100 can also be performed in connection with the system 700 in which the electric motor 702 is used in place of the turbine 208. In such an example, rather than controlling the valve(s) to power the turbine 208 (block 1102), the example method 1100 includes activating the electric motor 702 via the electric motor controller 706. The electric motor 702 can be used to similarly start the first engine 108. Once the first engine 108 is started, the electric motor controller 706 deactivates the electric motor 702.

Figure 12:
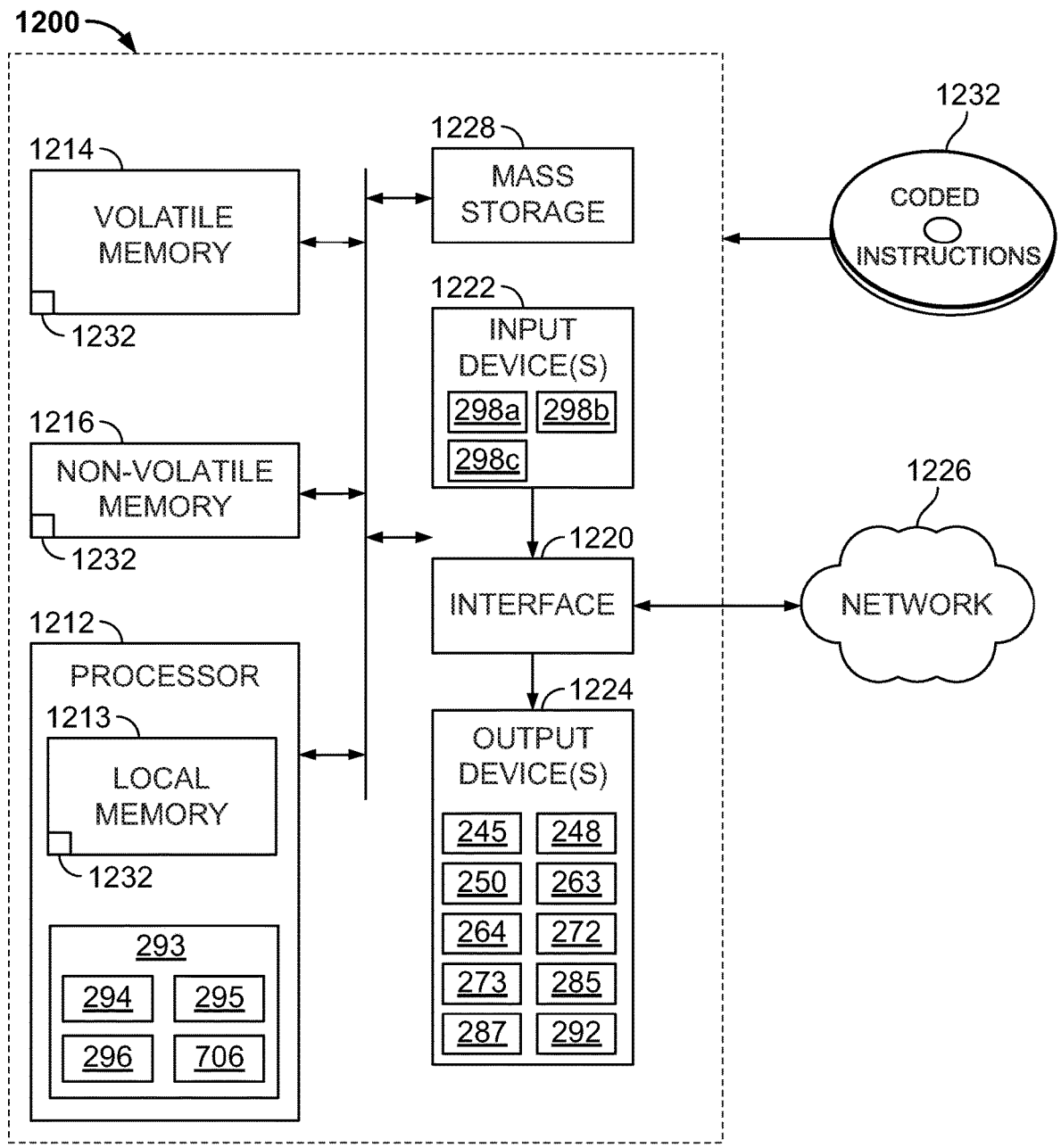
FIG. 12 is a block diagram of an example processing platform structured to execute the methods of FIGS. 10 and 11 to implement an example control system of any of the example systems of FIGS. 2, 6, and/or 7.

FIG. 12 is a block diagram of an example processor platform 1200 structured to execute the instructions of FIGS. 10 and 11 to implement the control system 293 of FIGS. 2, 6, and 7. The processor platform 1200 can be, for example, a server, a personal computer, a workstation, a self-learning machine (e.g., a neural network), an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the example input/output module 294, the example comparator 295, the example instrument controller 296, the example electric motor controller 706, and/or, more generally, the example control system 293.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. In this example, the input device(s) 1222 can include the sensors 298a-298c. Additionally or alternatively, the input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output device(s) 1224 can include, for example, the valves 245, 248, 250, 263, 264, 272, 273, 285, 287, 292. Additionally or alternatively, the output device(s) 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. Thus, the interface circuit 1220 of the illustrated example can include a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 10 and 11 may be stored in the mass storage device 1228, in the volatile memory 1214, in the non-volatile memory 1216, and/or on a removable non-transitory computer readable storage medium such as a CD or DVD.

From the foregoing, it will be appreciated that example systems and methods have been disclosed that enable a compressor to be operated independently in different modes of operation by an accessory gearbox or another power source, such as a turbine or an electric motor, to generate pressurized air that can be used for one or more systems of an aircraft. Using a shaft driven compressor to generate pressurized air is more efficient than known bleed air systems that extract bleed air and reduce the temperature/pressure of the air. Further, by using a turbine or electric motor to drive the compressor in certain conditions, complicated and heavy variable speed transmissions can be eliminated. The example systems utilize overrunning clutches to disconnect certain components to reduce the loads that would otherwise be caused on the system. The example systems and methods also enable a turbine to serve dual purposes and, thus, reduce the amount of parts and weight added to the aircraft. Thus, the example systems and methods increase fuel efficiency of the aircraft.

The following paragraphs provide various examples of the examples disclosed herein.

Example 1 includes a pressurized air system for an aircraft. The pressurized air system includes a compressor having a compressor inlet and a compressor outlet. The compressor inlet is to receive air from a first air source and the compressor outlet to supply pressurized air to an environmental control system (ECS) of the aircraft. The pressurized air system also includes a turbine having a turbine inlet to receive air from a second air source, a first overrunning clutch operatively coupled between an output shaft of an accessory gearbox and the compressor, the accessory gearbox operatively coupled to a drive shaft extending from an engine of the aircraft, and a second overrunning clutch operatively coupled between the compressor and the turbine. The first and second overrunning clutches enable the accessory gearbox to drive the compressor during a first mode of operation and enable the turbine to drive the compressor during a second mode of operation.

Example 2 includes the pressurized air system of Example 1, further including a third overrunning clutch operatively coupled between a starter input shaft of the accessory gearbox and the turbine, wherein, during a third mode of operation, high pressure air is supplied to the turbine to drive the starter input shaft to start the engine.

Example 3 includes the pressurized air system of Example 2, wherein the turbine is operatively coupled to the third overrunning clutch via a planetary gearbox that provides a gear reduction from the turbine to the starter input shaft of the accessory gearbox.

Example 4 includes the pressurized air system of Examples 2 or 3, further including a first passageway fluidly coupling the compressor outlet and the ECS, a second passageway fluidly coupling the first passageway to a fan duct of the engine, and a fan duct inlet valve operatively coupled to the second passageway, wherein, during the third mode of operation, the fan duct inlet valve is opened to direct the pressurized air supplied by the compressor outlet to the fan duct of the engine.

Example 5 includes the pressurized air system of any of Examples 1-4, wherein the second air source is bleed air from a high-pressure compressor of the engine.

Example 6 includes the pressurized air system of Example 5, further including a passageway fluidly coupling a bleed air port of the high-pressure compressor and the turbine inlet, and a turbine inlet valve operatively coupled to the passageway, wherein during the first mode of operation, the turbine inlet valve is closed such that bleed air is not supplied to the turbine, and during the second mode of operation, the turbine inlet valve is opened to supply the bleed air from the high-pressure compressor to the turbine inlet to power the turbine to drive the compressor.

Example 7 includes the pressurized air system of any of Examples 1-6 1, wherein the first air source is fan air from a fan duct of the engine.

Example 8 includes the pressurized air system of any of Examples 1-7, wherein the first and second overrunning clutches are sprag clutches.

Example 9 includes the pressurized air system of any of Examples 1 or 5-8, further including a starter turbine operatively coupled to a starter input shaft of the accessory gearbox, and wherein, during a third mode of operation, high pressure air is supplied to the starter turbine to drive the accessory gearbox and start the engine.

Example 10 includes a method including operating, via a controller, a pressurized air system in a first mode of operation. The pressurized air system includes a compressor operatively coupled to an accessory gearbox via a first overrunning clutch. A compressor outlet of the compressor is fluidly coupled to one or more systems of an aircraft that receive pressurized air. The pressurized air system also includes a turbine operatively coupled to the compressor via a second overrunning clutch, wherein, during the first mode of operation, the accessory gearbox drives the compressor to produce the pressurized air. The method further includes determining, via the controller, an operating speed of an engine of the aircraft, and when the operating speed is below a threshold speed, operating the pressurized air system in a second mode of operation by sending, via the controller, a command signal to open a turbine inlet valve disposed between the turbine and a bleed air port of the engine such that bleed air is supplied to the turbine to power the turbine to drive the compressor to produce the pressurized air.

Example 11 includes the method of Example 10, further including when the operating speed is above the threshold speed, operating the pressurized air system in the first mode of operation by sending, via the controller, a command signal to close the turbine inlet valve.

Example 12 includes the method of Examples 10 or 11, wherein the turbine is operatively coupled to the accessory gearbox via a third overrunning clutch, the method further including prior to operating the pressurized air system in the first mode of operation, operating the pressurized air system in a third mode of operation by sending, via the controller, a command signal to open a turbine starter valve disposed between a high pressure air source and the turbine such that high pressure air is supplied to the turbine to drive the turbine to power the accessory gearbox and start the engine.

Example 13 includes the method of Example 12, wherein the high pressure air source is at least one of an auxiliary power unit (APU) or another engine of the aircraft.

Example 14 includes the method of Examples 12 or 13, wherein the pressurized air system includes a fan duct inlet valve coupled to a passageway fluidly coupling the compressor outlet to a fan duct of the engine, the method further including during the third mode of operation, sending, via the controller, a command signal to open the fan duct inlet valve to direct air exiting the compressor outlet to the fan duct of the engine.

Example 15 includes the method of Example 10, wherein the pressurized air system includes a starter turbine operatively coupled to the accessory gearbox, the method further including prior to operating the pressurized air system in the first mode of operation, operating the pressurized air system in a third mode of operation by sending, via the controller, a command signal to open a turbine starter valve disposed between a high pressure air source and the starter turbine such that high pressure air is supplied to the starter turbine to drive the turbine to power the accessory gearbox and start the engine.

Example 16 includes an aircraft including a system that operates via pressurized air, an accessory gearbox operatively coupled to and powered by a drive shaft extending from an engine, and a pressurized air system. The pressurized air system includes a compressor having a compressor outlet fluidly coupled to the system that operates via pressurized air, the compressor operatively coupled to the accessory gearbox, a turbine, and an overrunning clutch operatively coupled between the compressor and the turbine, wherein the accessory gearbox is to drive the compressor in a first mode of operation to produce pressurized air, and the turbine is to drive the compressor in a second mode of operation to produce the pressurized air, the overrunning clutch to disconnect the compressor from the turbine while the accessory gearbox is driving the compressor in the first mode of operation.

Example 17 includes the aircraft of Example 16, wherein the overrunning clutch is a first overrunning clutch, further including a second overrunning clutch operatively coupled between the accessory gearbox and the compressor. The second overrunning clutch is to disconnect the compressor from the accessory gearbox while the turbine is driving the compressor in the second mode of operation.

Example 18 includes the aircraft of Example 17, further including a third overrunning clutch operatively coupled between an input shaft of the accessory gearbox and the turbine, wherein, during a third mode of operation, high pressure air is supplied to the turbine to drive the input shaft to start the engine.

Example 19 includes the aircraft of any of Examples 16-18, wherein the turbine includes a turbine outlet fluidly coupled to a fan duct of the engine, such that air exiting the turbine during the second mode of operation is provided to the fan duct for thrust recovery.

Example 20 includes the aircraft of any of Examples 16-19, wherein the system that operates via pressurized air includes at least one of an environmental control system (ECS) or an anti-icing system.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:
1. A method comprising:
 operating, via a controller, a pressurized air system in a first mode of operation, the pressurized air system including:

a compressor having a compressor inlet and a compressor outlet, the compressor inlet configured to receive air from a first air source and the compressor outlet configured to supply pressurized air to an environmental control system (ECS) of an aircraft;
a turbine having a turbine inlet configured to receive air from a second source;
a first overrunning clutch operatively coupled between an output shaft of an accessory gearbox and the compressor, the accessory gearbox operatively coupled to a drive shaft extending from an engine of the aircraft;
a second overrunning clutch operatively coupled between the compressor and the turbine, the first and second overrunning clutches configured to enable the accessory gearbox to drive the compressor during the first mode of operation and to enable the turbine to drive the compressor during a second mode of operation; and
a third overrunning clutch operatively coupled between a starter input shaft of the accessory gearbox and the turbine, wherein the pressurized air system is configured to, during a third mode of operation, supply high pressure air to the turbine to drive the starter input shaft to start the engine;
determining, via the controller, an operating speed of the engine of the aircraft; and
operating the pressurized air system in the second mode of operation when the operating speed is below a threshold speed by sending, via the controller, a command signal to open a turbine inlet valve disposed between the turbine and a bleed air port of the engine such that bleed air is supplied to the turbine to power the turbine to drive the compressor to produce the pressurized air.

2. The method of claim 1, further including:
operating the pressurized air system in the first mode when the operating speed is above the threshold speed by sending, via the controller, a command signal to close the turbine inlet valve.

3. The method of claim 1, further including:
prior to operating the pressurized air system in the first mode of operation, operating the pressurized air system in the third mode of operation by sending, via the controller, a command signal to open a turbine starter valve disposed between a high pressure air source and the turbine such that the high pressure air is supplied to the turbine to drive the turbine to power the accessory gearbox and start the engine.

4. The method of claim 3, wherein the high pressure air source is at least one of an auxiliary power unit (APU) or another engine of the aircraft.

5. The method of claim 3, wherein the pressurized air system includes a fan duct inlet valve coupled to a passageway, the passageway fluidly coupling the compressor outlet to a fan duct of the engine, the method further including:
during the third mode of operation, sending, via the controller, a command signal to open the fan duct inlet valve to direct air exiting the compressor outlet to the fan duct of the engine.

6. A pressurized air system for an aircraft, the pressurized air system comprising:
a compressor having a compressor inlet and a compressor outlet, the compressor inlet configured to receive air from a first air source and the compressor outlet configured to supply pressurized air to an environmental control system (ECS) of the aircraft;
a turbine having a turbine inlet configured to receive air from a second air source;
a first overrunning clutch operatively coupled between an output shaft of an accessory gearbox and the compressor, the accessory gearbox operatively coupled to a drive shaft extending from an engine of the aircraft;
a second overrunning clutch operatively coupled between the compressor and the turbine, the first and second overrunning clutches configured to enable the accessory gearbox to drive the compressor during a first mode of operation and to enable the turbine to drive the compressor during a second mode of operation; and
a third overrunning clutch operatively coupled between a starter input shaft of the accessory gearbox and the turbine, wherein the pressurized air system is configured to, during a third mode of operation, supply high pressure air to the turbine to drive the starter input shaft to start the engine.

7. The pressurized air system of claim 6, wherein the turbine is operatively coupled to the third overrunning clutch via a planetary gearbox configured to provide a gear reduction from the turbine to the starter input shaft of the accessory gearbox.

8. The pressurized air system of claim 6, further including:
a first passageway fluidly coupling the compressor outlet and the ECS;
a second passageway fluidly coupling the first passageway to a fan duct of the engine; and
a fan duct inlet valve operatively coupled to the second passageway, wherein the fan duct inlet valve, during the third mode of operation, is configured to be opened to direct the pressurized air supplied by the compressor outlet to the fan duct of the engine.

9. The pressurized air system of claim 6, wherein the second air source is bleed air from a high-pressure compressor of the engine.

10. The pressurized air system of claim 9, further including:
a passageway fluidly coupling a bleed air port of the high-pressure compressor and the turbine inlet; and
a turbine inlet valve operatively coupled to the passageway, wherein the turbine inlet valve, during the first mode of operation, is configured to be closed such that bleed air is not supplied to the turbine, and wherein the turbine inlet valve, during the second mode of operation, is configured to be opened to supply the bleed air from the high-pressure compressor to the turbine inlet to power the turbine to drive the compressor.

11. The pressurized air system of claim 10, wherein the passageway is a first passageway and the turbine inlet valve is a first turbine inlet valve, the pressurized air system further including:
a second passageway fluidly coupling a high pressure air source and the first passageway;
a second turbine inlet valve operatively coupled to the first passageway, wherein the first turbine inlet valve is operatively coupled to the first passageway between the bleed air port and the second passageway, and the second turbine inlet valve is operatively coupled to the first passageway between the second passageway and the turbine inlet; and
a turbine starter valve operatively coupled to the second passageway.

12. The pressurized air system of claim 11, wherein the first and second turbine inlet valves, during the second mode of operation, are configured to be opened to supply the bleed air from the high-pressure compressor to the turbine inlet and the turbine starter valve is closed, and wherein, during the third mode of operation, the first turbine inlet valve is configured to be closed, the second turbine inlet valve is configured to be opened, and the turbine starter valve is configured to be opened to provide the high pressure air to the turbine inlet.

13. The pressurized air system of claim 11, wherein the high pressure air source is an auxiliary power unit (APU).

14. The pressurized air system of claim 11, wherein the high pressure air source is another engine of the aircraft.

15. The pressurized air system of claim 6, wherein the first air source is fan air from a fan duct of the engine.

16. The pressurized air system of claim 6, wherein the first and second overrunning clutches are sprag clutches.

17. An aircraft comprising:
   a system that operates via pressurized air;
   an accessory gearbox operatively coupled to and powered by a drive shaft extending from an engine; and
   a pressurized air system including:
      a compressor having a compressor outlet fluidly coupled to the system that operates via pressurized air, the compressor operatively coupled to the accessory gearbox;
      a turbine;
      a first overrunning clutch operatively coupled between the compressor and the turbine;
      a second overrunning clutch operatively coupled between the accessory gearbox and the compressor, wherein the accessory gearbox is configured to drive the compressor in a first mode of operation to produce pressurized air, and the turbine is configured to drive the compressor in a second mode of operation to produce the pressurized air, the first overrunning clutch is configured to disconnect the compressor from the turbine while the accessory gearbox is driving the compressor in the first mode of operation, the second overrunning clutch is configured to disconnect the compressor from the accessory gearbox while the turbine is driving the compressor in the second mode of operation; and
      a third overrunning clutch operatively coupled between an input shaft of the accessory gearbox and the turbine, wherein the pressurized air system is configured to, during a third mode of operation, supply high pressure air to the turbine to drive the input shaft to start the engine.

18. The aircraft of claim 17, wherein the turbine includes a turbine outlet fluidly coupled to a fan duct of the engine such that air exiting the turbine during the second mode of operation is provided to the fan duct for thrust recovery.

19. The aircraft of claim 17, wherein the system that operates via pressurized air includes at least one of an environmental control system (ECS) or an anti-icing system.

20. The aircraft of claim 17, wherein the turbine is operatively coupled to the third overrunning clutch via a planetary gearbox that provides a gear reduction from the turbine to the input shaft of the accessory gearbox.

* * * * *